United States Patent
Mizukami

(10) Patent No.: US 11,185,778 B2
(45) Date of Patent: Nov. 30, 2021

(54) COMPUTER-READABLE NON-TRANSITORY RECORDING MEDIUM, GAME SYSTEM, AND METHOD FOR CONTROLLING A GAME SYSTEM

(71) Applicant: GREE, Inc., Tokyo (JP)

(72) Inventor: Gaku Mizukami, Tokyo (JP)

(73) Assignee: GREE, Inc., Tokyo (JP)

(*) Notice: Subject to any disclaimer, the term of this patent is extended or adjusted under 35 U.S.C. 154(b) by 83 days.

(21) Appl. No.: 16/676,672

(22) Filed: Nov. 7, 2019

(65) Prior Publication Data

US 2020/0070054 A1 Mar. 5, 2020

Related U.S. Application Data

(63) Continuation of application No. 14/626,105, filed on Feb. 19, 2015, now Pat. No. 10,500,494.

(30) Foreign Application Priority Data

Feb. 20, 2014 (JP) .................. 2014-030684

(51) Int. Cl.
*A63F 13/5378* (2014.01)
*A63F 13/35* (2014.01)
(Continued)

(52) U.S. Cl.
CPC .......... *A63F 13/5378* (2014.09); *A63F 13/35* (2014.09); *A63F 13/822* (2014.09); *A63F 13/55* (2014.09)

(58) Field of Classification Search
None
See application file for complete search history.

(56) References Cited

U.S. PATENT DOCUMENTS

2008/0125220 A1 5/2008 Sakaguchi
2016/0199734 A1 7/2016 Sakakibara

FOREIGN PATENT DOCUMENTS

JP 2001239059 A 9/2001
JP 2005169138 A 6/2005
(Continued)

OTHER PUBLICATIONS

Shattered Union published by 2K Games on Oct. 17, 2005 available for download on Steam—see attached steam screenshot from Steam store (Year: 2005).*

(Continued)

*Primary Examiner* — James S. McClellan
*Assistant Examiner* — Peter J Iannuzzi
(74) *Attorney, Agent, or Firm* — Maier & Maier, PLLC

(57) ABSTRACT

Provided is a game program that can increase the strategic aspect of a battle event between groups. In the battle event, an image of a map M is first displayed on client devices, and the characters in the groups are placed in an initial arrangement. Turns are taken successively, and in each turn, the destination of movement by characters is selected, the characters move, and combat takes place between characters. During the battle event, it is determined whether a time limit set as the running time of the battle event has been reached. If so, position points P of the characters in the final arrangement on the map M at that point in time are tallied. Which one of the groups wins the battle event is determined based on the total number of position points P for each group.

18 Claims, 21 Drawing Sheets

(51) Int. Cl.
*A63F 13/822* (2014.01)
*A63F 13/55* (2014.01)

(56) References Cited

FOREIGN PATENT DOCUMENTS

| JP | 2012053640 | A | 3/2012 |
|---|---|---|---|
| JP | 2012249770 | A | 12/2012 |
| JP | 2013066524 | A | 4/2013 |
| JP | 5237493 | B1 | 7/2013 |
| JP | 2013138715 | A | 7/2013 |

OTHER PUBLICATIONS

Shattered Union manual pushed by 2K Games (Year: 2005).*
"Shattered Union Episode 1—The War Begins" published on YouTube. com at (https://youtu.be/DLajxc8ael8?list=PLFex21QVQ5LON2po8CEKtT5gutbkcH4wK) by user General Coma see attached screenshot (Year: 2016).*
Civilization 5 released Sep. 21, 2010 on STEAM see attached screenshot (Year: 2010).*
YouTube video "TGX plays CIV 5 | 15 second turn timer" by That GuyX3 published at (https://www.youtube.com/watch?v=jF2zqxIF5h4) see attached screenshot (Year: 2015).*
Japanese Office Action dated Oct. 7, 2014 in corresponding Japanese Application No. 2014-030684; 2 pgs.
Y. Shiga, Bandai Namco, PSP, "Mobile Suit Gundam AGE" A Settlement of Simultaneous Sale of 2 Packages; "Universe Axel" and "Cosmic Drive", May 25, 2012, Impress Watch Corporation, Game Watch, [searched via internet on Sep. 26, 2014] http://game.watch.impress.co.jp/docs/news/20120525_535152.html.
Japanese Office Action dated Jul. 21, 2015, in connection with corresponding JP Application No. 2015-081798 (11 pgs.).
"Shattered Union Episode 1—The War Begins" published on YouTube. com at (https://youtu.be/DLajxc8ael8?list=PLFex21QVQ5LON2po8CEKtT5gutbkcH4wK) by user General Coma.
Civilization 5 released Sep. 21, 201 O on Steam.
YouTube video "TGX plays CIV 5 | 15 second turn timer" by That GuyX3 published at (https://www.youtube.com/watch?v=jF2zqxIF5h4).
Shattered Union published by 2K Games on Oct. 17, 2005 available for download on Steam.
Shattered Union manual pushed by 2K Games.

* cited by examiner

COMPUTER-READABLE NON-TRANSITORY RECORDING MEDIUM, GAME SYSTEM, AND METHOD FOR CONTROLLING A GAME SYSTEM

CROSS-REFERENCE TO RELATED APPLICATIONS

This application is a continuation of U.S. patent application Ser. No. 14/626,105, filed on Feb. 19, 2015, entitled COMPUTER-READABLE NON-TRANSITORY RECORDING MEDIUM, GAME SYSTEM, AND METHOD FOR CONTROLLING A GAME SYSTEM, which in turn claims priority to and the benefit of Japanese Patent Application No. 2014-030684 filed Feb. 20, 2014, the entire contents of which are incorporated herein by reference.

FIELD

At least one embodiment of the present disclosure relates to a computer-readable non-transitory recording medium, game system, and method for controlling a game system that provide client devices, over a network, with a game that includes a battle event.

BACKGROUND

In recent years, games provided to player-operated client devices, such as mobile terminal devices, by a server device over a communication network have grown popular, and many game titles have been released. These games are available in a variety of types and categories. Among such games, social games that allow multiple players to participate in the same game are especially booming. Social games that periodically or non-periodically hold a battle event (which includes not only battles, but also competitions such as team sports), in which groups battle each other, are also well known.

As an example of the latter, for example JP 2012-53640A discloses a team competition in which a plurality of players divided into two teams battle, and JP 2013-066524A discloses an online game in which, in a Coliseum hall that is a predetermined imaginary space in the game, upon matching of a plurality of parties whose members are characters controlled by players, the members of the parties battle each other.

In the field of social gaming, such a battle between groups is customarily referred to as a "guild battle" and is also referred to as "GvG". The letter "G" represents the initial letter "G" of the word "group" or "guild", where a "guild" generally refers to a simulation or an image of trade associations that existed in medieval European cities. The letter "v" in "GvG" stands for "versus".

Many games that include "GvG" as a battle event have the format of a role-playing game (RPG), in which the game unfolds as a story that takes place within a consistent worldview. A representative example is a card deck RPG in which player-controlled characters that are the main actors in the RPG use a so-called deck composed of game media, such as cards. While expanding their deck by defeating opponent characters or enemy characters and making their characters grow (to a higher level), players proceed by clearing game stages such as dungeons and quests.

In addition to "GvG", other well-known games for teams to form and compete include games in which a plurality of characters temporarily or permanently cooperate as a team and progress through the game stages of an RPG while defending the team's stronghold or territory from attack by enemy characters. Some games that adopt this format have a so-called tower defense (TD) type battle mode, allowing for increase and expansion of teams in a "wave" between game stages, and include elements and features of RPG-type games.

In both RPG type and TD type games including a conventional GvG, however, the determination of which of the groups or teams wins the battle event is often made with a simple formula. In greater detail, the winning group or team tends to be determined by, for example, (a) whether all opponent characters or enemy characters were eliminated (whether all allied characters were eliminated), (b) whether the stronghold or enemy territory of the opponent group or enemy group was invaded (whether the stronghold of one's own group or one's own army was conquered), or (c) the amount of points, at the end of the battle event, that were earned by defeating opponent characters or enemy characters.

Therefore, in order to defeat opponent characters and enemy characters, game strategy for groups or teams has mainly focused on including more highly-experienced, high-level, strong characters as group members, and on how to strengthen each character. As a result, the way battle events are fought becomes monotonous, without changing through progressive game stages. This leads to problems such as combat and other actions being sluggish during the majority of a GvG battle, and inexperienced, low-level players having difficulty participating in groups or battle events.

SUMMARY

A computer-readable non-transitory recording medium according to embodiment of the present disclosure stores a computer program, the computer program causing a computer for providing a game to a client device over a network to function as: storage means for storing a game parameter, used in a battle event, in association with each of a plurality of characters; image processing means for displaying, on the client device, an image of a map formed by a plurality of areas, territory of opposing groups being delineated and the characters being initially arranged in areas adjacent to home territory on the map; and control means for causing the characters to move on the map during the battle event, allowing for combat between characters satisfying a predetermined condition, and determining which of the groups wins the battle event based on a position on the map of each of the characters at an ending time of the battle event (referred to below as the "final arrangement").

Upon executing the computer program with this configuration, the territory (home territory) of the player's group, the areas adjacent to home territory, the territory (enemy territory) of the opponent group, and the areas adjacent to enemy territory are shown on the map displayed on the client device. As the initial setting for the battle event, each group can arrange the characters that are the members of the group in the areas adjacent to home territory. The form of combat between characters in the battle event is not limited. For example, as time passes and the characters move between the areas on the map, combat may take place when confronting an enemy character, or depending on the attributes of a character, the character may be allowed to attack a distant opponent character that has not been confronted. Movement and combat are repeated until the end of the battle event, and based on the final arrangement in the battle event, it is determined which of the groups wins the battle event. Accordingly, high-level game strategy is required not only to attempt to defeat more opponent characters or invade (reach) enemy territory, but also so that the final arrangement of a player's group is superior to the final arrangement of the opponent group. The winner of the battle event may also be determined when opponents are eliminated and/or when invading enemy territory.

The control means may determine which of the groups wins the battle event based on an arrangement on the map of the characters at a point when a predetermined running time for the battle event elapses. The control means may allow, based on a predetermined condition, the characters in the groups to attack the territory of an opponent group or a first target of defense arranged within the territory of an opponent group and determine which of the groups wins the battle event based on damage sustained by the territory or the first target of defense of the opponent group at the ending time of the battle event.

In this case, examples of the predetermined condition include (i) no character of the opponent group being in the territory of the opponent group, (ii) all characters of the opponent group having been eliminated, or (iii) the territory or the first target of defense of the opponent group being positioned within an attack range of the characters in the groups.

Furthermore, from among the characters in each group, a general may be selected for each group, and the control means may determine which of the groups wins the battle event based on a predetermined parameter set for the general.

Alternatively, the control means may determine which of the groups wins the battle event based on whether any of the characters in each group has invaded the territory of an opponent group.

From among the characters in each group, a character concealing a first designated game item may be selected, with characters in an opponent group being prevented from identifying the character concealing the first designated game item during the battle event, and the control means may determine which of the groups wins the battle event based on a predetermined parameter set for the character concealing the first designated game item.

Furthermore, a second designated game item may be hidden in the territory (home territory) or the areas adjacent to home territory of each group, with characters in an opponent group being prevented from identifying a location where the second designated game item is hidden during the battle event.

For each group, a second target of defense may be arranged in the territory (home territory) or the areas adjacent to home territory of each group, and the control means may determine which of the groups wins the battle event based on whether the second target of defense has been captured by an opponent group.

In greater detail, for example position points for each area on the map may be set for each group (for example, the position points being set to increase stepwise from home territory towards enemy territory), and the control means may calculate a total of the position points corresponding to the final arrangement of each group in the battle event and determine which of the groups wins the battle event based on the total position points for each group.

The battle event may be divided into a plurality of turns, and the control means may simultaneously allow every group participating in the battle event to determine, in a predetermined time within each turn, a position that is a destination of movement by the characters and may move the characters in every group to the determined position at once or at any time. The "turns" in the present disclosure are the units by which the game unfolds and are executed in order either continuously along the time axis (chronologically) or intermittently.

With this structure, control of the characters in the groups is not restricted to alternating between turns, and a player controlling a character in any group can determine the area to which the character will move next during the predetermined time in each turn (during which the members in the group may consult using a communication tool such as chatting). The control means may move each character at any time (on a continual basis) after the destination of movement is determined, or the control means may move all the characters at once after the predetermined time for the turn has elapsed.

In the latter case, when the characters move at once after the predetermined time for the turn has elapsed, players cannot confirm the destination of opponent characters when selecting their own destination. Therefore, it becomes an important battle strategy to select the destination while predicting the change in the overall arrangement of characters in a player's own group and in the opponent group. Furthermore, depending on the communication environment of the client device and the network, a time lag may occur during screen display on the client device. If a time lag occurs, then in the former case when characters move at any time, a character that has moved in order to combat an opponent character may find that the opponent character has already moved from the target area, resulting in a "cat and mouse chase" that detracts from the appeal of the game. This problem can be addressed by having characters move at once after the predetermined time for the turn has elapsed.

The battle event may be divided into a plurality of turns, and the control means may alternately allow each group participating in the battle event to determine, in a predetermined time within each turn, a position that is a destination of movement by the characters and may move the characters for each group alternately to the determined position at once or at any time.

With this structure, operations on characters in the groups are permitted in alternate turns (i.e. are alternately restricted). In other words, as in a regular turn system, the groups alternately take turns. For example, for the predetermined time of a certain turn, only the players controlling characters in one of the groups are the turn players that can determine the area that is the destination of movement, and in the next turn, only the players controlling characters in the other group are the turn players that can determine the area that is the destination of movement. The control means may move each character at any time (on a continual basis) after the destination of movement is determined, or the control means may move the characters at once after the predetermined time for the turn has elapsed.

The above-described game parameter associated with each character may include action points consumed during at least one of movement, attack, and defense by the characters. The action points may also be transferrable (receivable and deliverable) between the characters in the same group.

With this structure, when the number of action points is equal to or greater than the number of points consumed during at least one of movement, attack, and defense, then the character having those action points can perform actions such as movement, attack, and defense. Since action points are transferable between allied characters, for example non-proficient players can transfer their own action points to a character that is highly likely to remain to the end of the battle event without being defeated (a player with a high degree of proficiency or attack strength and/or a high defense strength), thereby further contributing to the group victory that is determined based on the final arrangement on the map.

Furthermore, in this structure, when all of the action points of one of the characters are consumed, the control means may forcibly move the character to a predetermined position in home territory or the areas adjacent to home territory (for example, the areas adjacent to home territory that correspond to the final line of defense of home territory). At this time, if the position points of the area to which the character is forcibly moved are set low (for example, zero or a negative value), then the character contributes less to the total number of position points in the final arrangement. The character can, however, make a comeback by receiving action points from another character, for example, thus gaining an opportunity to rejoin the battle event.

Furthermore, the game parameter may include a property that is set for each character, an attack strength of each character may be set for each area on the map, and the control means may determine the attack strength of each character for each area based on the property of the character and on a relative positional relationship between a first area and a second area among the areas, the first area being a location occupied by the character (at that point in time), and the second area being a location other than the first area.

Additionally, the player may be allowed to set a game item in the areas adjacent to home territory, the game item producing a predetermined effect on the characters in an opponent group and/or on the characters in the player's group.

A game system and a method for controlling the game system according to the present disclosure are effectively implemented by the above-described computer program according to the present disclosure.

As described above, according to embodiments of the present disclosure, based on the final arrangement in a battle event, it is determined which of the groups wins the battle event, making necessary a high-level game strategy that aims for the final arrangement of a player's group to be superior to the final arrangement of the opponent group. Since a highly strategic game can thus be achieved, the battle event and the entire game become more lively and amusing, and non-proficient players are encouraged to participate in the battle event and the game.

BRIEF DESCRIPTION OF THE FIGURES

Exemplary embodiments of the present disclosure will be further described below with reference to the accompanying drawings, wherein.

DETAILED DESCRIPTION

Figure 1:
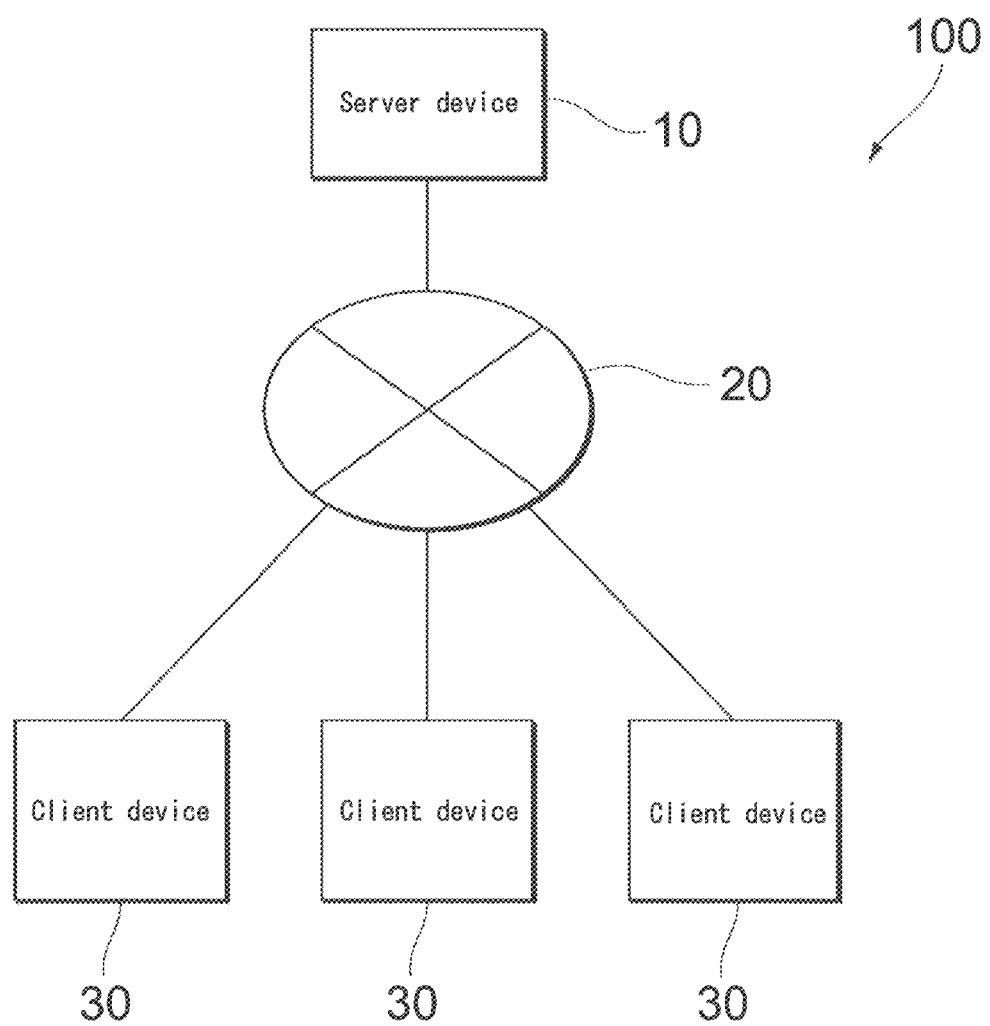
FIG. 1 is a system block diagram schematically illustrating an embodiment of a network structure pertaining to a game system according to an exemplary embodiment of the present disclosure.

The following describes exemplary embodiments of the present disclosure in detail. The following exemplary embodiments are only examples to illustrate the present disclosure. The present disclosure is in no way limited to these embodiments. Furthermore, various modifications may be made without departing from the scope of the present disclosure. A person of ordinary skill in the art could adopt embodiments in which the elements described below are replaced by equivalents, and such embodiments are also included in the scope of the present disclosure. Furthermore, the positional relationships of up, down, left, right, etc. indicated as necessary are based on the illustrated examples, unless otherwise specified. The various dimensional ratios in the drawings, however, are not limited to the illustrated ratios. To facilitate understanding, the present disclosure is implemented using an information processing device for a game in the embodiments described below as examples, yet as mentioned above, the present disclosure is not limited in this way.

FIG. 1 is a system block diagram schematically illustrating an exemplary embodiment of a network structure pertaining to a game system according to the present disclosure. A game system 100 includes a server device 10 that provides a game service that includes a battle event to a plurality of client devices 30 over a network 20.

The server device 10 is a network node having a function to provide the game service and is, for example, configured using a host computer with high computing power. The server function is implemented by a predetermined server program running on the host computer. The computer constituting the server device 10 is not limited to a host computer and may, for example, be a general-purpose communication terminal device. Furthermore, the host computer constituting the server device 10 need not be only one computer and may be configured using a plurality of computers distributed over the network 20.

The network 20 is a communication network combining wired networks (such as a LAN (Local Area Network), WAN (Wide Area Network), or VAN (Value Added Network)) and wireless networks (such as a mobile communication network, satellite communication network, Bluetooth, WiFi (Wireless Fidelity), or HSDPA (High Speed Downlink Packet Access)). The client device 30 is a network node having a function to receive provision of the game service and is, for example, configured using a general-purpose communication terminal device.

In a game system configured this way, a request signal is output to the server device 10 from a player-operated client device 30, and the request signal is transmitted to the server device 10 via the network 20. Having received the request signal from the client device 30, the server device 10 sends a response signal in accordance with the request back to the client device 30. The response signal is transmitted to the client device 30 via the network 20. An online game service is provided by exchanging these signals.

In embodiment of the present disclosure, as described above, the network node that provides the game service is referred to as the "server device", and the network node that receives provision of the game service is referred to as the "client device", regardless of the amount of computing power. Between the server device 10 and the client devices 30 there may be provided a gateway server or the like that converts the communication protocol between these devices.

Furthermore, non-limiting examples of the general-purpose communication terminal device constituting the server device 10 or the client device 30 include a desktop computer, a notebook computer, a tablet computer, a laptop computer, and a mobile phone. In greater detail, examples of the mobile phone include handheld mobile terminals such as PDC (Personal Digital Cellular), PCS (Personal Communication System), GSM® (Global System for Mobile communications), PHS (Personal Handy phone System), and PDA (Personal Digital Assistant). Non-limiting examples of a data communication system in such mobile phones include standards such as W-CDMA (Wideband Code Division Multiple Access), CDMA-2000 (Code Division Multiple Access-2000), IMT-2000 (International Mobile Telecommunication-2000), and Wibro (Wireless Broadband Internet).

Figure 2:
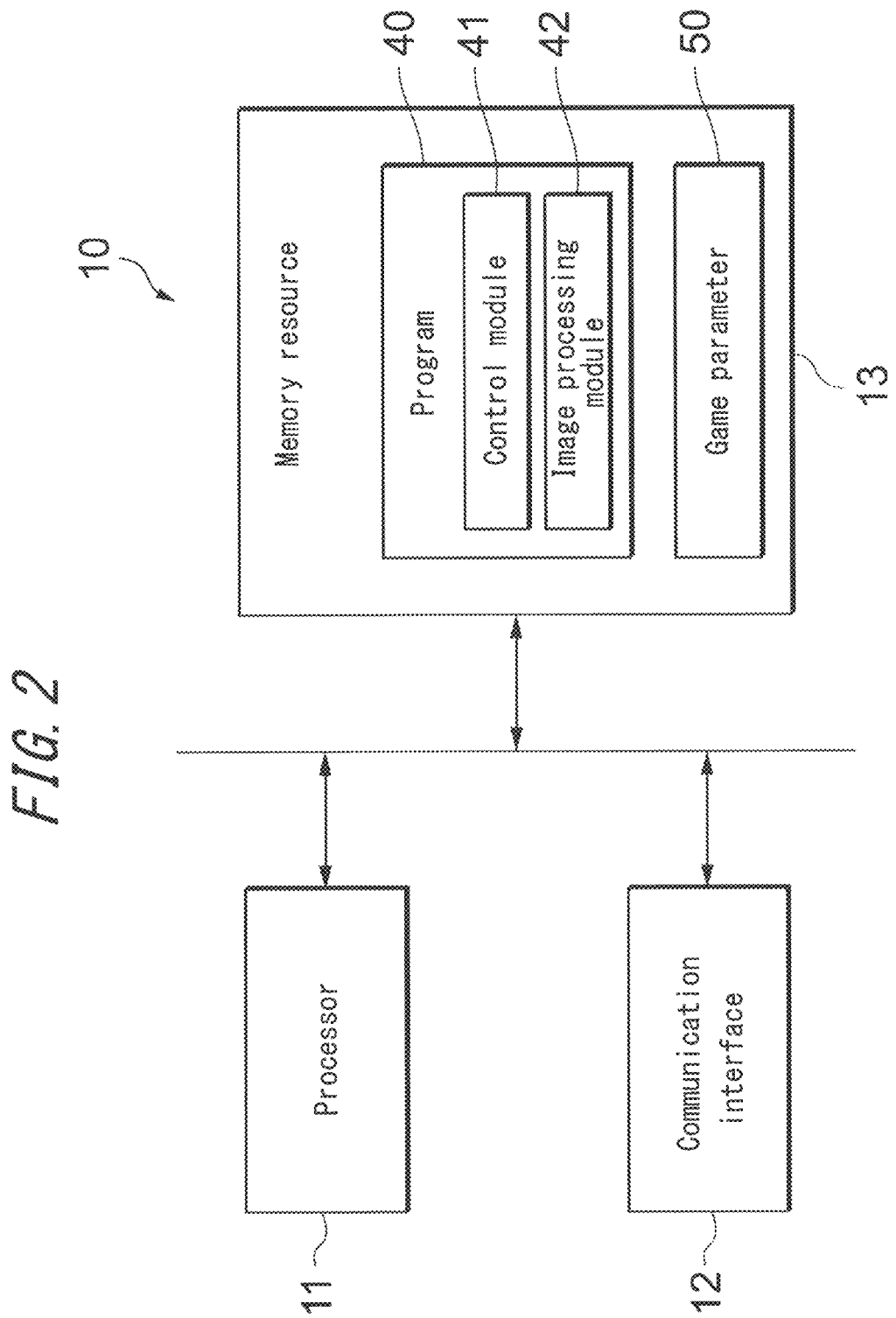
FIG. 2 is a block diagram schematically illustrating the structure of an embodiment of a server device pertaining to a game system according to an embodiment of the present disclosure.

FIG. 2 is a block diagram schematically illustrating the structure of an embodiment of a server device pertaining to a game system according to the present disclosure. As illustrated in FIG. 2, the server device 10 includes a processor 11, a communication interface 12, and a memory resource 13. The processor 11 is configured by an arithmetic logic unit, which performs arithmetic operations, logic operations, bit operations, and the like; and various registers (program counter, data register, instruction register, general-purpose register, and the like). The processor 11 decodes and executes a computer program 40 according to embodiments of the present disclosure stored in the memory resource 13 and responds to requests from the plurality of client devices 30.

The computer program 40 is a program for executing game processing in response to requests from the plurality of client devices 30 and includes a plurality of software modules that are called and executed as appropriate during running of a main program (the above-described server program or the like) on the server device 10. Such software modules are each modularized subprograms for executing particular processing (a variety of control operations, image generation and display processing, communication processing, and the like in the game) and are created using, for example, procedures, subroutines, methods, functions, data structures, and the like. The term "module" refers to a unit that can be compiled independently (yet modules are not limited in this way).

As one such modularized subprogram, the computer program 40 includes a control module 41 (control means) that executes a variety of control operations in a battle event, which is one game event included in the game service, and an image processing module 42 (image processing means) that executes processing to generate an image in the battle event and to display the generated image on the client device 30.

Game parameters 50 are stored in the memory resource 13 in association with characters controlled by players via the client devices 30. The game parameters 50 in embodiments of the present disclosure are a variety of variables serving as indices for conducting the game service that includes the battle event. The variables include action points (AP) that are consumed during at least one of movement, attack, and defense by a character on the below-described map used in the battle event; properties PT such as job or trade set for each character; life points or hit points HP representing stamina, life force, or the like; a level representing proficiency or experience; and a variety of items that are provided initially or can be acquired as the game progresses and can be used, collected, or the like in the game (virtual currency, points, cards, regular moves, special moves, recovery moves, skills, other rewards, and the like known to one having ordinary skill in the art).

From another perspective, the "reward" included in the game parameters 50 can be said to indicate the overall value concept of providing a greater advantage, as the value of the reward is higher, relative to opponents as the battle game unfolds. While the "reward" can be interpreted as bearing a resemblance to money in the real world, the "reward" is not necessarily limited to a value resembling money during game processing in a virtual space. For example, the "reward" may be an actual character (especially, a character whose rarity is high), an item that increases the character's attack strength, an item that restores the character's stamina or heals damage, or the like, or may be an actual attack move, points earned upon inflicting damage to an opponent character, or the like. The reward can be any character or attribute known to a person having ordinary skill in the art.

Furthermore, either a portion or all of the game parameters 50 may have a value interchangeable between characters or may be variables that vary in accordance with changes in a character's attack capability or restorative capability. In addition to the above-described examples, the game parameters 50 may also include, for example, a variable indicating the length of time since the day the player participated in a battle event or logged into the game system.

The memory resource 13 is, for example, a logical device that provides a memory area of a physical device (for example, a computer-readable recording medium such as a disk drive, semiconductor memory, or the like). A plurality of physical devices may be mapped onto one logical device, or one physical device may be mapped onto a plurality of logical devices. Data, logs, and the like indicating the access history, play conditions, game progress status, and the like of each client device 30 are stored in the memory resource 13. Furthermore, the communication interface 12 is a hardware module for connecting to the client devices 30 over the network 20. For example, the communication interface 12 may be a modulator-demodulator such as an ISDN modem, ADSL modem, cable modem, optical modem, soft modem, or any other device known to a person of ordinary skill in the art.

Figure 3:
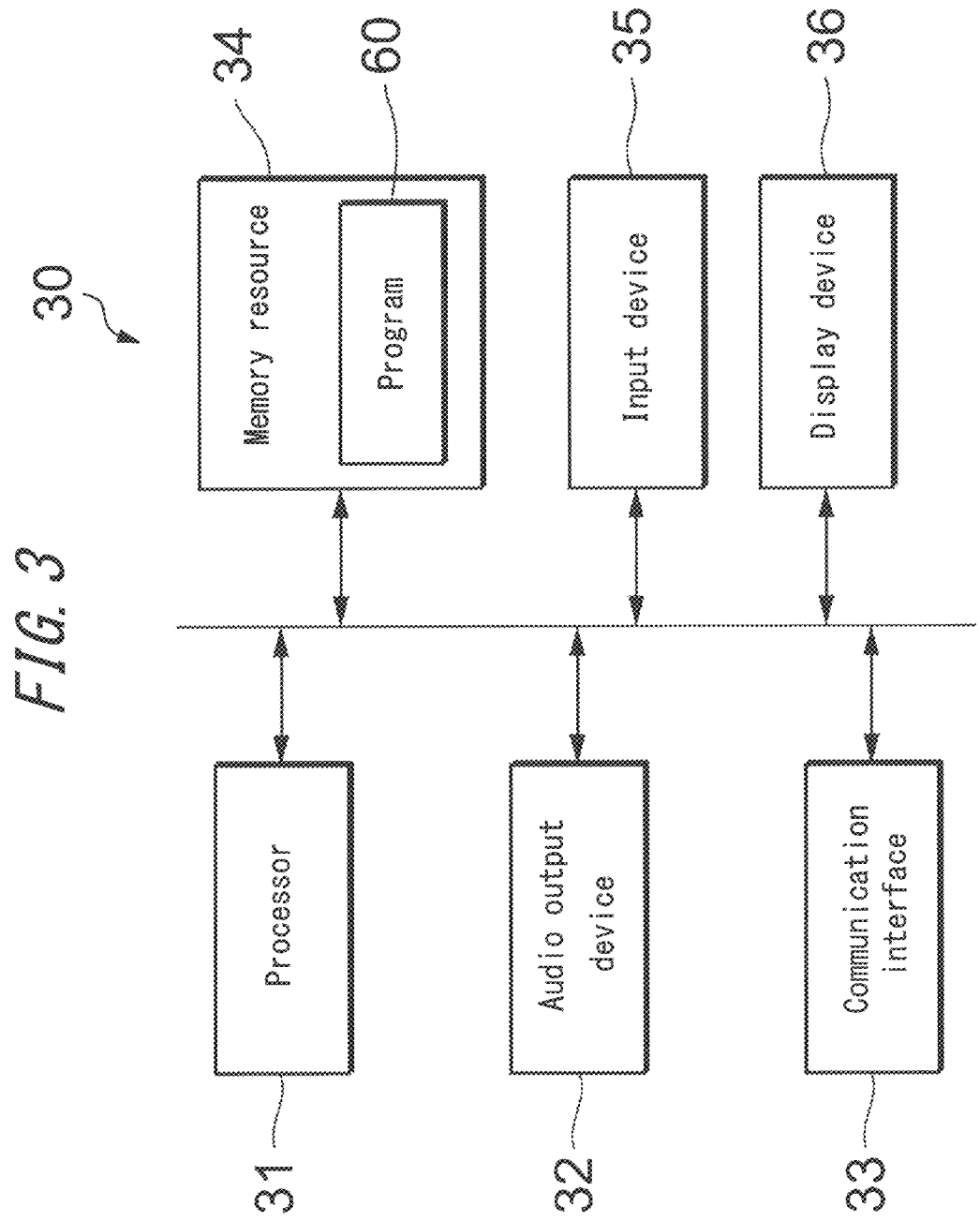
FIG. 3 is a block diagram schematically illustrating the structure of an embodiment of a client device pertaining to a game system according to an embodiment of the present disclosure.

FIG. 3 is a block diagram schematically illustrating the structure of an exemplary embodiment of a client device pertaining to a game system according to an embodiment of the present disclosure. The client device 30 includes a processor 31, an audio output device 32, a communication interface 33, a memory resource 34, an input device 35, and a display device 36.

The processor 31 is configured by an arithmetic logic unit and various registers (program counter, data register, instruction register, general-purpose register, and the like). The processor 31 decodes and executes a program 60 stored in the memory resource 34, transmits a request to the server device 10 in accordance with operation information input into the input device 35, and receives a response from the server device 10. The program 60 is an application program for connecting to the server device 10 and receiving provision of the game service that includes a battle event. This application program can be distributed over the network 20 by the server device 10.

The memory resource 34 is a logical device that provides a memory area of a physical device (for example, a computer-readable recording medium such as a disk drive, semiconductor memory, or the like) and also stores operating system programs, driver programs, various data, and the like used for processing by the client device 30. Examples of driver programs include an input device driver program for controlling the input device 35 and output device driver programs for controlling the audio output device 32 and the display device 36. Examples of the various data include image data for objects, backgrounds, and the like that appear in the game screens.

The audio output device 32 is, for example, a sound player that can reproduce sound data such as game sound effects. The communication interface 33 provides a connection interface with the server device 10 and is configured using a wireless communication interface or a wired communication interface. The input device 35 provides an interface that receives input operations from the player and may, for example, be a touch panel, keyboard, mouse, or the like. Furthermore, the display device 36 provides a player with an image display interface for game screens or the like. Examples include an organic EL display, liquid crystal display, CRT display, or any other device known to a person of ordinary skill in the art.

When the player logs into a service related to the game system of the server device 10 by operating the input device 35 to input authentication information (an ID and password or the like), a personalized screen associated with the player's authentication information is displayed on the display device 36. On the personalized screen, a menu screen related to the group to which an individual player belongs is displayed. A "group" as referred to here is a virtual collection whose members are characters each controlled by a player via the client device 30. Such groups may be created and established for each game title or may be common to a plurality of game titles. In the field of social games, a group established for such a purpose is also referred to as a "guild", "party", "team", "community", or any name known to one having ordinary skill in the art. A "character" refers to a virtual object that obeys a player's instructions and acts in a virtual space on the player's behalf.

A character controlled by a player with experience in participating in the game service provided by the server device 10 belongs to a group as a general rule, and the character's history is associated with the authentication information for the player and stored in the memory resource 13 of the server device 10. An editing menu screen related to the group is displayed on the display device 36 based on this history. On the other hand, the character controlled by a player participating in the game service provided by the server device 10 for the first time does not belong to a particular group as a general rule, and therefore a menu screen for belonging to a group (for example, a screen to search for a group or to establish a new group) is displayed on the display device 36. After the group to which the player belongs is determined or selected and the player selects to participate in the game service, a screen for a game event underway at that point in time is displayed on the display device 36.

[1] Basic Battle

First, as an example of gameplay in an exemplary embodiment of a computer program, game system, and method for controlling the game system according to the present disclosure, a "basic battle" is described. This "basic battle" unfolds between groups (for example, groups 300 and 400) and is an offensive and defensive battle in which the groups defend their own territory (home territory) and capture their opponent's territory (enemy territory). The winner is determined, for example, (1) based on the total damage inflicted on enemy territory or on a target of defense (such as an opponent's castle), or (2) based on the final arrangement of characters in each group on the map, as described below, when no group has inflicted damage on enemy territory or a target of defense, or when the amounts of total damage are equal. At this point, the conditions set to allow for an attack on enemy territory may, for example, be that no characters of the opponent group are within enemy territory, that all the characters in the opponent group have been eliminated, or that the enemy territory or target of defense is within a range attackable by the character.

Figure 4:
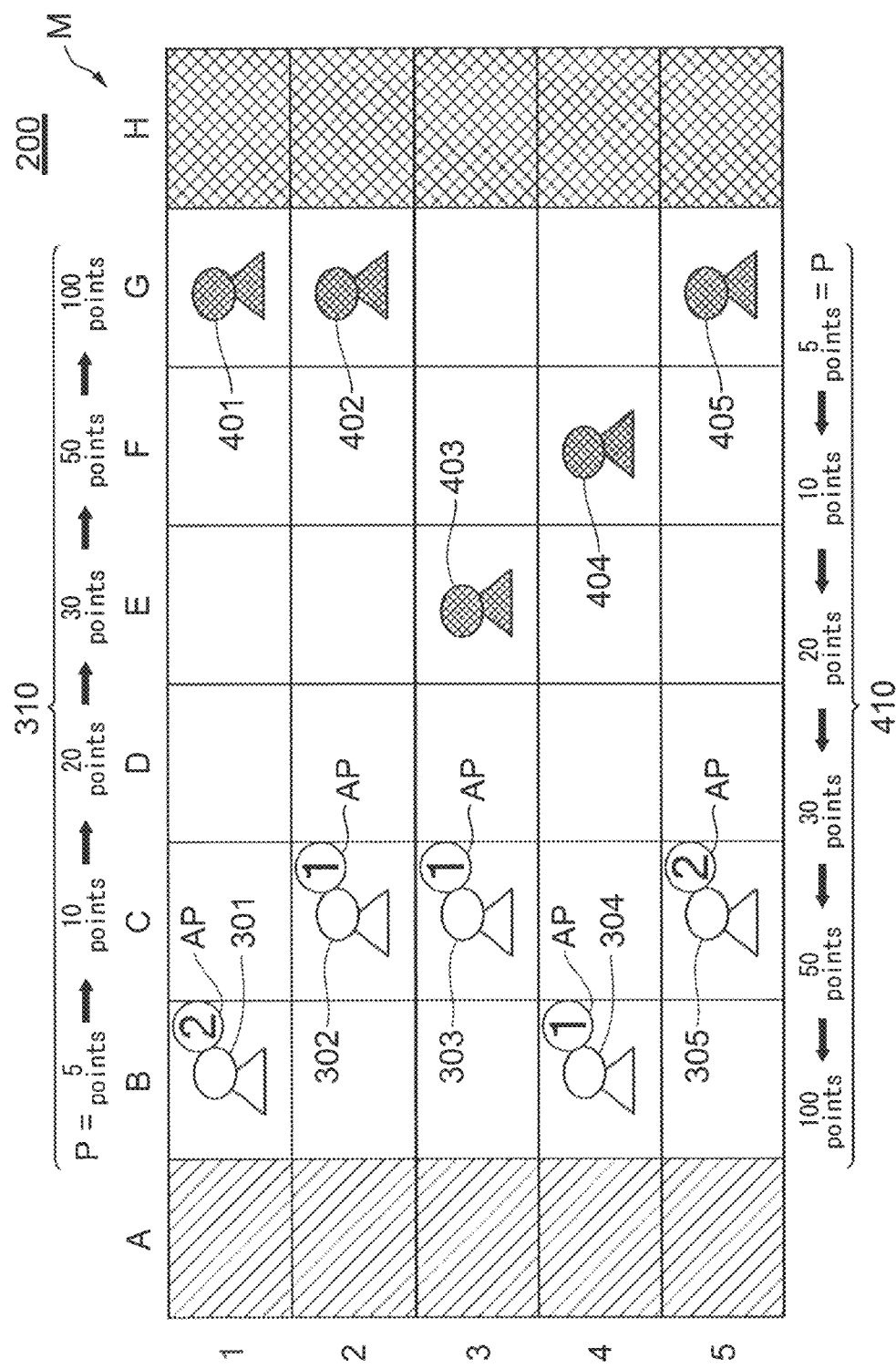
FIG. 4 is a plan view illustrating an example of a game screen for a basic battle in a battle event according to an embodiment.

FIG. 4 is a plan view schematically showing an example of a game screen 200 according to the present embodiment. In FIG. 4, an image of a map M formed by a plurality of areas is being displayed on the display device 36 of the client device 30. The map M is divided into, for example, a matrix of five rows (row 1 to row 5) by eight columns (column A to column H). The squares of the matrix correspond to the areas. Individual areas are represented below, as necessary, by matrix coordinates (n, m, where n=1 to 5 and m=A to H).

The map M is a virtual field on which the battle event unfolds between groups 300 and 400. Characters 301, 302, 303, 304, and 305 belonging to one group 300 and characters 401, 402, 403, 404, and 405 belonging to the other group 400 are displayed on the map M. The battle event between the groups 300 and 400 may, for example, be a quest encountered during a game scenario in an RPG game or a game event held as a wave, and the battle event corresponds to the above-described "guild battle" (GvG).

On the map M, the areas located in column A are the territory for group 300, and the range from column B to column D is set as the areas adjacent to home territory for group 300. The border between column A and column B is the final line of defense for the home territory of group 300, and column B effectively corresponds to the line of defense. On the other hand, the areas located in column H are the territory for group 400, and the range from column G to column E is set as the areas adjacent to home territory for group 400 (areas adjacent to enemy territory from the perspective of group 300). The border between column H and column G is the final line of defense for the home territory of group 400, and column G effectively corresponds to the line of defense. In the situation illustrated in FIG. 4, the characters of the groups 300 and 400 have been arranged within areas adjacent to home territory (initial arrangement) before the start of the battle event or at the start of the battle event. As the initial arrangement, characters are not allowed to be positioned within the areas adjacent to enemy territory. From this initial arrangement, the characters assault the areas adjacent to enemy territory while combating opponent characters in an attempt to break through the opponent group's final line of defense and invade the enemy territory, while guarding against attack by opponent characters and staunchly defending their own territory's final line of defense. This battle event can thus be considered a game that includes a TD-type aspect.

Each character has a job set as a property. A plurality of jobs may be prepared for selection by players, or jobs may be randomly assigned upon participation in the game. Alternatively, if the game is a card game in which players select a character card from their card deck and have the character on the character card participate in the battle event, the job may be specified on the character card, or the character's job may be appropriately set or made changeable by combining the character card with a separate job card.

Each character is displayed on the game screen 200 so as to appear with clothing or equipment corresponding to the character's job. In this battle event, the allowable range of movement on the map M and the attack range on the map M are set for each character in accordance with the character's job. Furthermore, as described below with reference to FIG. 9, the attack strength in each area is adjusted in accordance with the job and the position of each character on the map. FIG. 4 also shows an example of the action points AP consumed during at least one of movement, attack, and defense by characters on the above-described map as circled numbers for characters 301 to 305 in group 300. In this example, characters 301 and 305 each have "2" action points AP, and characters 302, 303, and 304 each have "1" action point AP. The action points AP and other game parameters may be displayed on the map M or on a different field than the map M, or may be omitted from display.

Figure 5:
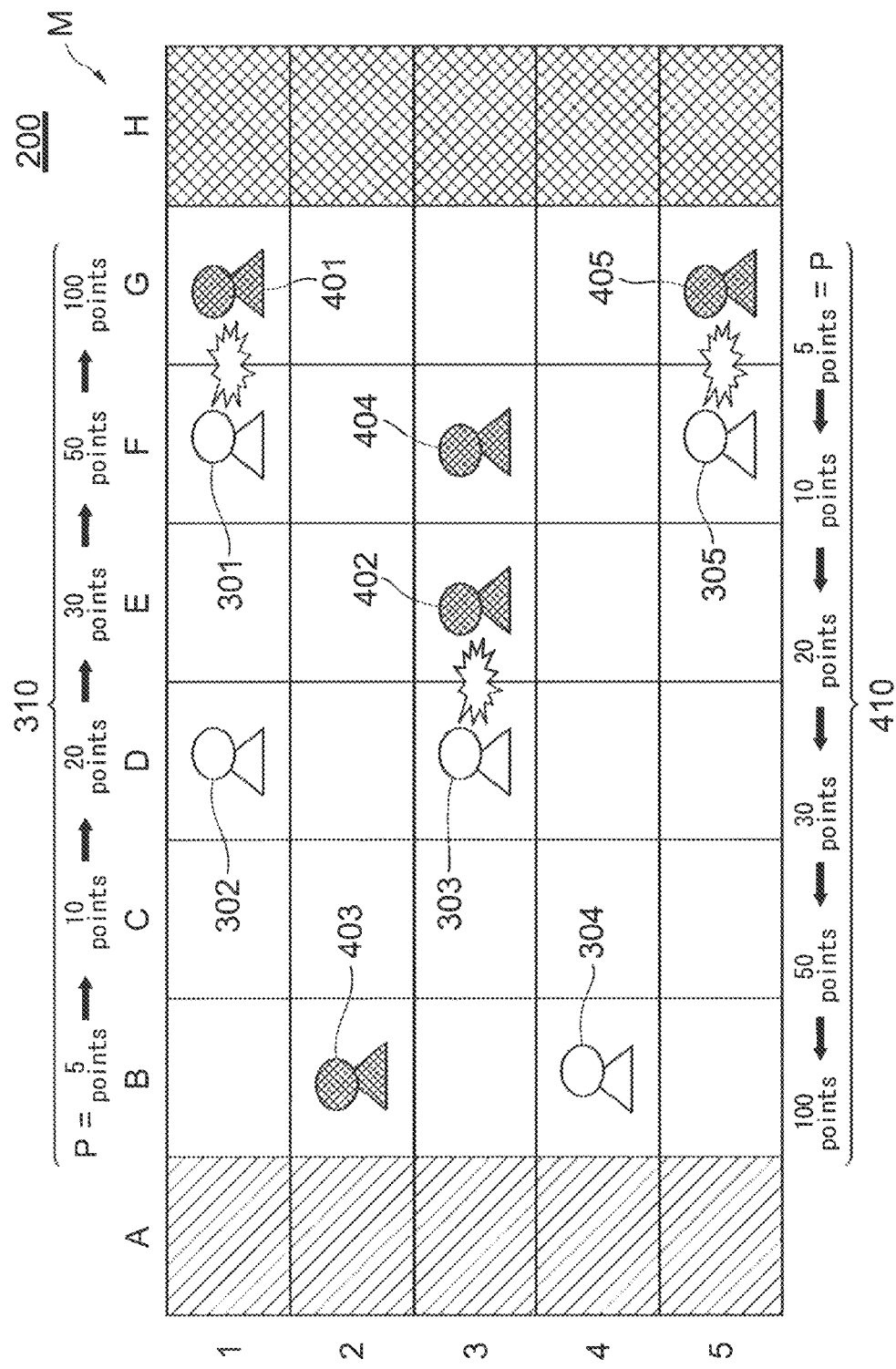
FIG. 5 is a plan view illustrating an example of combat taking place between characters in a battle event according to an embodiment.

When a character has at least the number of action points AP consumed by movement (for example, "1" per move), each character moves on the map within the character's allowable range of movement, and when facing an opponent character, combat between characters begins. Combat may be carried out automatically, without player instruction, through arithmetic control by the control module 41 of the server device 10 based on the characteristics of each character, such as equipment, abilities, and skills, or combat may be carried out based on player instructions, such as the player selecting the move or the like to use against an opponent character. FIG. 5 is a plan view schematically illustrating an example of combat about to take place, or taking place, between characters that have confronted each other.

In greater detail, since character 301 has moved from area (1, B) in the initial position illustrated in FIG. 4 towards enemy territory to area (1, F) and has confronted character 401 that has stayed in area (1, G), a battle between these characters ensues. Since character 303 has moved from area (3, C) towards enemy territory to area (3, D) and has confronted character 402 that has moved from area (2, G) to area (3, E), a battle between these characters ensues. Furthermore, since character 305 has moved from area (5, C) towards enemy territory to area (5, F) and has confronted character 405 that has stayed in area (5, G), a battle between these characters ensues.

As for the other characters in group 300, character 302 has moved from area (2, C) to area (1, D), and character 304 is waiting in area (4, B) without having moved from the initial arrangement. In group 400, character 403 has slipped between the characters in group 300 from area (3, E) in the initial arrangement to reach area (2, B) just before the final line of defense for the territory of group 300, and character 404 has moved from area (4, F) to area (3, F), immediately behind character 402, to make the defense stronger (redundant).

As described above, in the present battle event, characters assault enemy territory in an attempt to break through the opponent group's final line of defense to invade enemy territory, while guarding against attack by opponent characters and staunchly defending their own territory's line of defense. In this battle event, however, the running time is determined in advance, and for example the ending time of the battle event may be reached before the individual combats illustrated in FIG. 5 are complete. In a non-limiting example of a conventional guild battle (GvG), since not all of the characters in the groups 300 and 400 have been eliminated, or since opponent characters have not invaded the territories of the groups 300 and 400 (i.e. have not broken the final line of defense), which of the groups 300 and 400 wins cannot be determined. Alternatively, the winner between the groups 300 and 400 has to be decided for example based on the amount of damage or the like inflicted on opponent characters during the individual combats between characters.

By contrast, in the battle event of the present embodiment, which of the groups 300 and 400 wins is determined based on the position on the map of each of the characters at the ending time of the battle event (final arrangement). In greater detail, position points P are set for each area on the map M. The control module 41 totals the position points of the characters in the final arrangement for each of the groups 300 and 400, and based on the totals, determines which of the groups 300 and 400 wins the battle event.

The position points P are set separately for each of the groups 300 and 400. The position points P therefore differ for the same area depending on whether a character belongs to group 300 or 400. Specifically, as indicated by the examples of set points 310 and 320 in FIGS. 4 and 5, the position points P are set for group 300 to increase from column B to column G in the order of 5 points, 10 points, 20 points, 30 points, 50 points, and 100 points (example of set points 310) and conversely are set for group 400 to increase similarly in order from column G to column B (example of set points 320). In other words, on the map M, the position points P are set to increase stepwise from home territory towards enemy territory. With this setting, when the battle event ends with the state illustrated in FIG. 5 as the final arrangement, the position points earned for each of the groups 300 and 400 may be calculated as follows.

Group 300: 20+50+20+5+50=145 points

Group 400: 5+100+20+10+5=140 points

The final arrangement in FIG. 5 can be analyzed as follows. In group 400, characters 401 and 405 are staunchly defending the final line of defense at both sides (row 1 and row 5), while characters 402 and 404 are holding back the opponent character 303, who is attempting to break through the center, and character 403 is aiming to rush through and invade enemy territory. On the other hand, group 300 has adopted the tactic of assaulting enemy territory with as many characters as possible. As a result, the time limit is reached and the battle event ends when character 403 of group 400 is one step away from breaking through the final line of defense of enemy territory (group 300).

Whereas the total number of position points P for group 400 is 140, the total number of position points P for group 300 is 145, as described above. Hence, group 400 loses the battle event to group 300 by a narrow margin. It is therefore clear that a battle event of a game played with the computer program 40 of the present disclosure requires more elaborate tactics while formulating, reflecting on, and changing the battle strategy over the course of the battle.

With reference to FIGS. 4 and 5, the initial arrangement, the form of movement, the final arrangement, and the determination of the winner for the battle event of the present embodiment have been described. Next, an example of the form of movement by characters in each group in the battle event is further described with reference to FIGS. 6(A) to 6(C). First, this battle event is divided into a plurality of turns Ta (time t0 to t1), Tb (time t1 to t2), Tc (time t2 to t3), and Td (time t3 to t4) (times omitted below). These turns progress sequentially in time. While the time for these turns Ta, Tb, Tc, and Td depends on the time limit of the battle event, the turns may for example each be set to a few minutes (and each turn may be the same or a different length).

Figure 6A:
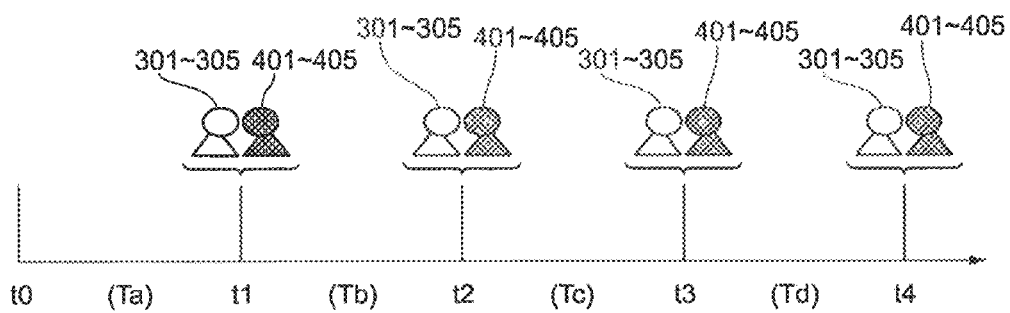
FIGS. 6(A) to 6(C) are conceptual diagrams illustrating an example of the form of movement by characters in a battle event according to an embodiment.

In the form illustrated in FIG. 6(A), for the duration until a predetermined time elapses in each of the turns Ta, Tb, Tc, and Td, ending the turn, the characters 301 to 305 in group 300 and the characters 401 to 405 in group 400 can select the area to which they will move before the start of the next turn. Then, for example when turn Ta ends and time t1 is reached, all of the characters 301 to 305 and 401 to 405 move at once to the selected destination area. Between times t1 and t2 (before or after movement of characters is complete), in turn Tb the next destination of movement can be selected based on tactics and on how the battle is unfolding. Subsequent turns Tc and Td are similar. In sum, in the form illustrated in FIG. 6(A), characters only select their destination without moving while each turn is taking place. The characters in both groups 300 and 400 can simultaneously perform this operation.

Figure 6B:
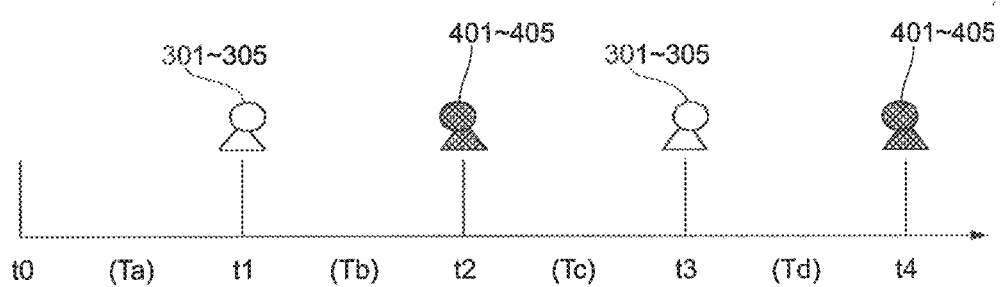

In the form illustrated in FIG. 6(B), for the duration until a predetermined time elapses in each of the turns Ta, Tb, Tc, and Td, ending the turn, only one of the groups 300 and 400 can select the destination of movement, and this group (the turn player) alternates in each turn. This form is close to a "turn system". In this form as well, only the destination is selected, without characters moving while each turn is taking place. In other words, as illustrated in FIG. 6(B), in turns Ta and Tc, only characters 301 to 305 in group 300 can select their destination, and the characters move at times t1 and t3. At this point, characters 401 to 405 in the opponent group 400 cannot move from the area they are occupying. On the other hand, in turns Tb and Td, only characters 401 to 405 in group 400 can select their destination, and the characters move at times t2 and t4. At this point, characters 301 to 305 in the opponent group 300 cannot move from the area they are occupying. In this case, however, although characters 301 to 305 in the opponent group 300 cannot move from their area, a setting may be adopted to allow characters 301 to 305 to attack characters 401 to 405 in group 400 and/or to recover from damage. In other words, with this setting, only movement by characters is restricted, whereas attack/recovery actions are not restricted.

Figure 6C:
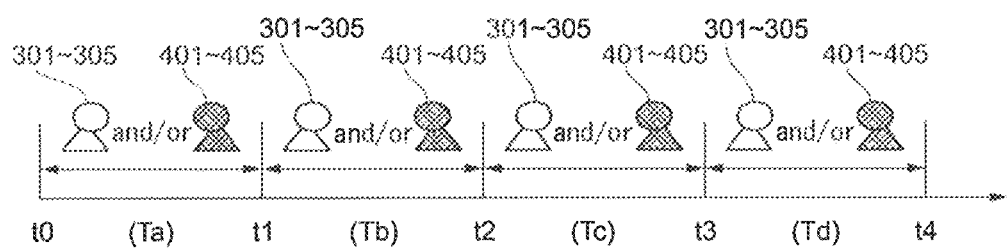

Furthermore, the form illustrated in FIG. 6(C) is similar to the forms illustrated in FIGS. 6(A) and 6(B), except that during the turns Ta, Tb, Tc, and Td, both selection of the destination of movement and actual movement take place freely. In other words, movement occurs not only at the time when the turn ends, but rather movement can occur at any time as soon as the destination is selected. In this case, characters can move multiple times in each turn, as long as time permits. Allowing both groups 300 and 400 to move at any time resembles a form without turns, yet the turns Ta, Tb, Tc, and Td serve as guides for progress of the event.

Figure 10:
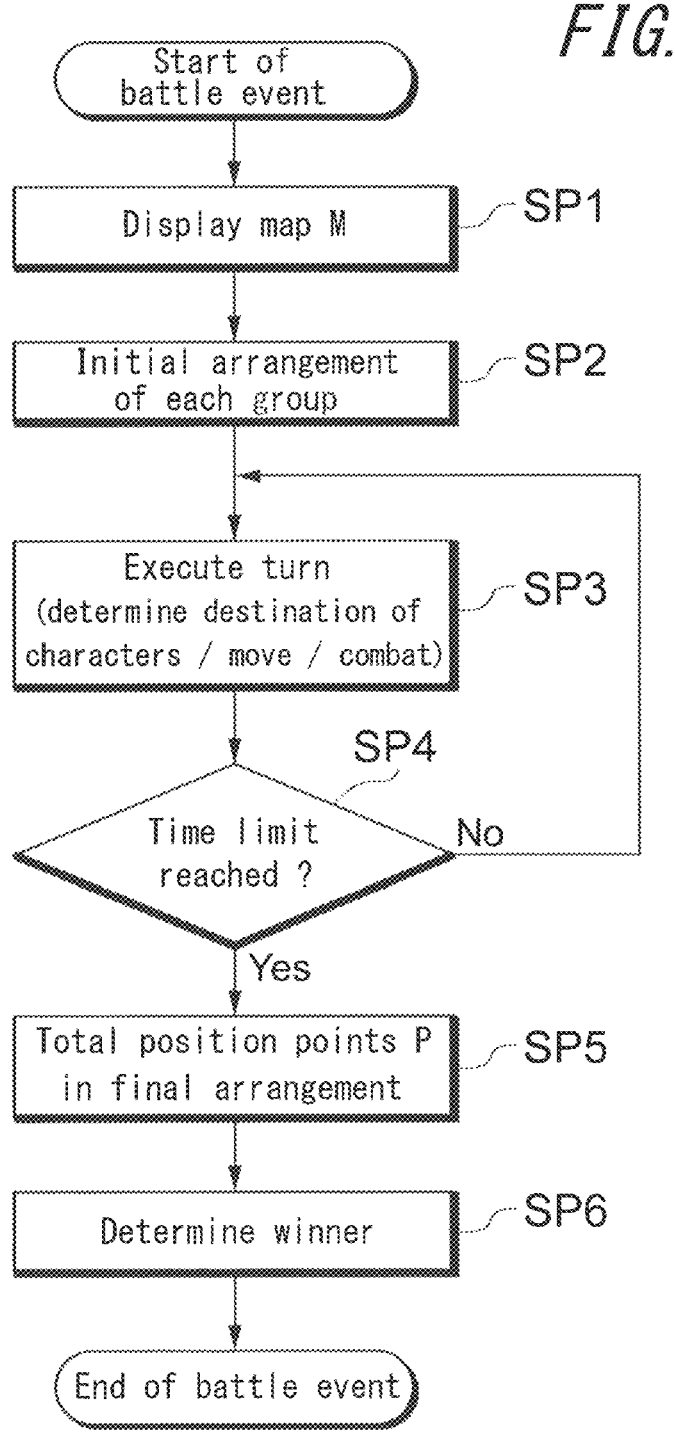
FIG. 10 is a flowchart of basic processing for a basic battle in a battle event according to an embodiment.

The basic processing for the above basic battle in the battle event is outlined in the flowchart of FIG. 10. First, when the battle event starts, the image processing module 42 displays an image of the map M on the display device 36 of the client device 30 (step SP1). Next, based on player instructions, the control module 41 sets the initial arrangement of positions for the characters in groups 300 and 400, and via the image processing module 42, displays an image in the state of the initial arrangement on the display device 36 of the client device 30 (step SP2; see FIG. 4). Turns Ta, Tb, Tc, Td then successively take place (see FIG. 6(A) to 6(C)). In each turn, selection of the character's destination, movement, and combat between characters take place via control processing by the control module 41, and the corresponding images are displayed via the image processing module 42 on the display device 36 of the client device 30 (step SP3).

During each turn, the control module 41 determines whether the time limit set as the running time for the battle event has been reached (step SP4). When the time limit has not been reached (step SP4: No), the processing in step SP3 is repeated. Conversely, when the time limit has been reached (step SP4: Yes), the control module 41 suspends the processing in step SP3 and tallies the position points P of the characters in the final arrangement on the map M at that point in time (step SP5). Based on how large the totals of position points P are for the groups 300 and 400, the control module 41 determines which of the groups 300 and 400 wins the battle event (step SP6), and the battle event ends.

Figure 7:
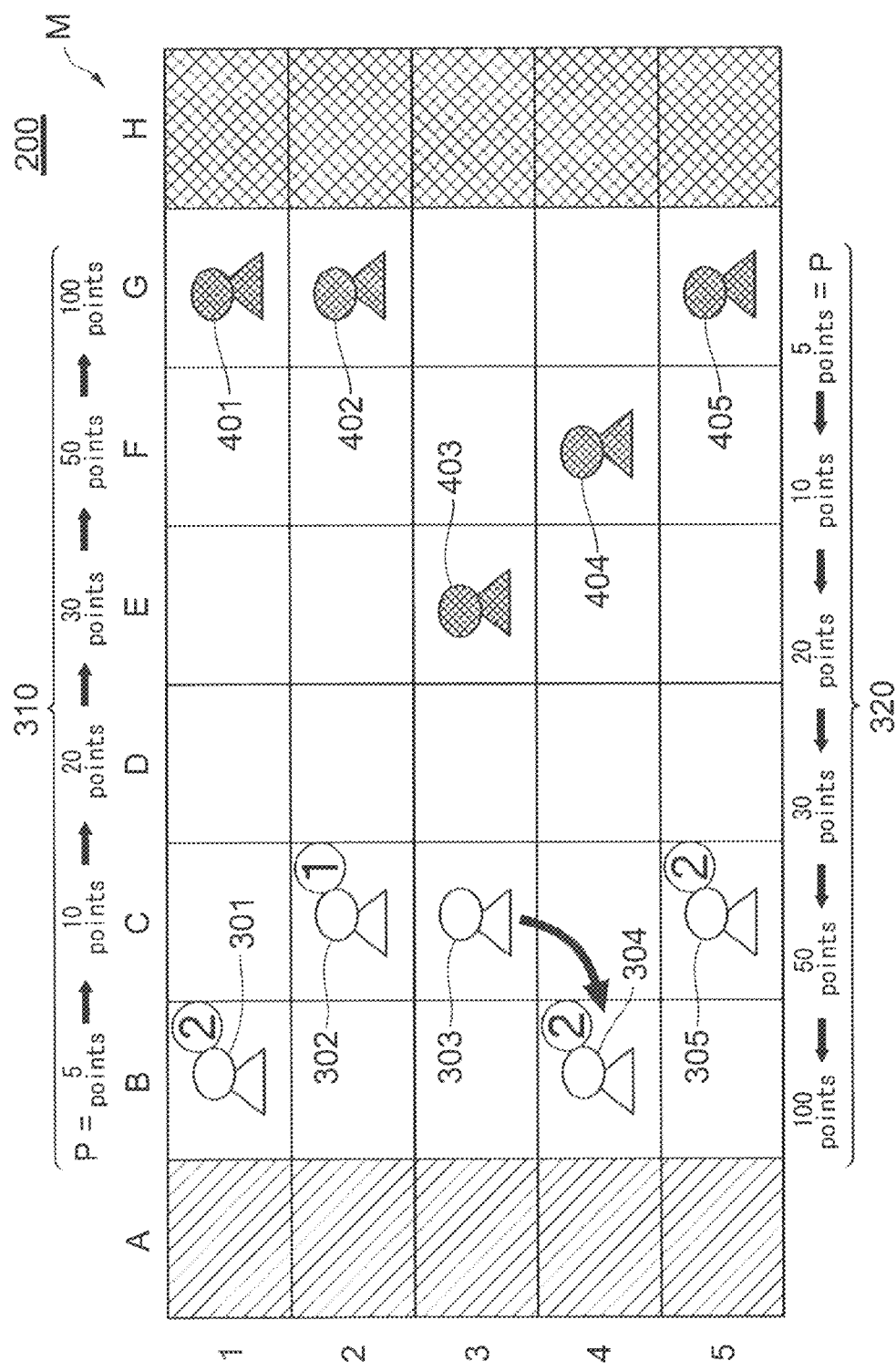
FIG. 7 is a plan view illustrating an example of delivery of action points between characters in the same group in a battle event according to an embodiment.

Next, FIG. 7 is a plan view illustrating an example of delivery of action points AP between characters in the same group in a battle event according to the present embodiment. In this example illustrated in FIG. 7, while in the initial arrangement illustrated in FIG. 4, character 303 in group 300 transfers "1" of the action points AP to character 304 (this action being indicated in FIG. 7 by a bold curved arrow; on the actual game screen, this arrow or other such marker for this action may be displayed or omitted). As a result, the action points AP of character 301 increase from "1" to "2".

Character 303 who has transferred all of the action points AP to the allied character 304 does not have enough action points for movement and cannot move from the current area to another area in the nearest turn. This action may, however, be an effective tactic as this battle event unfolds.

In other words, in this battle event, when a character loses in combat with an opponent character and all of the action points AP are consumed, the control module 41 forcibly moves the character to the last column in the areas adjacent to home territory (column B, column G). As illustrated by the example of set points 310 and 320, the position points P in column B and column G are the lowest. Therefore, instead of being forcibly moved as a result of combat with an opponent character, it may be advantageous to stay in the area of the initial arrangement. In particular, when one or more of the attack ability, defense ability, and proficiency of character 303 is lower than those of character 304, then it is most likely a more effective tactic for the group 300 to transfer the action points AP of character 303 to character 304 and have character 304 participate in combat as often as possible.

The action points AP of the character forcibly moved to the last column of the areas adjacent to home territory (column B, column G) may be restored in a predetermined turn or in every turn, or may be restored based on some sort of occasion or formula (for example, receiving action points AP from another character, having a character whose job includes the ability to restore action points AP use that ability, or obtaining an item that restores action points or the like). The character can thus gain an opportunity to rejoin the battle event at that point.

Figure 8:
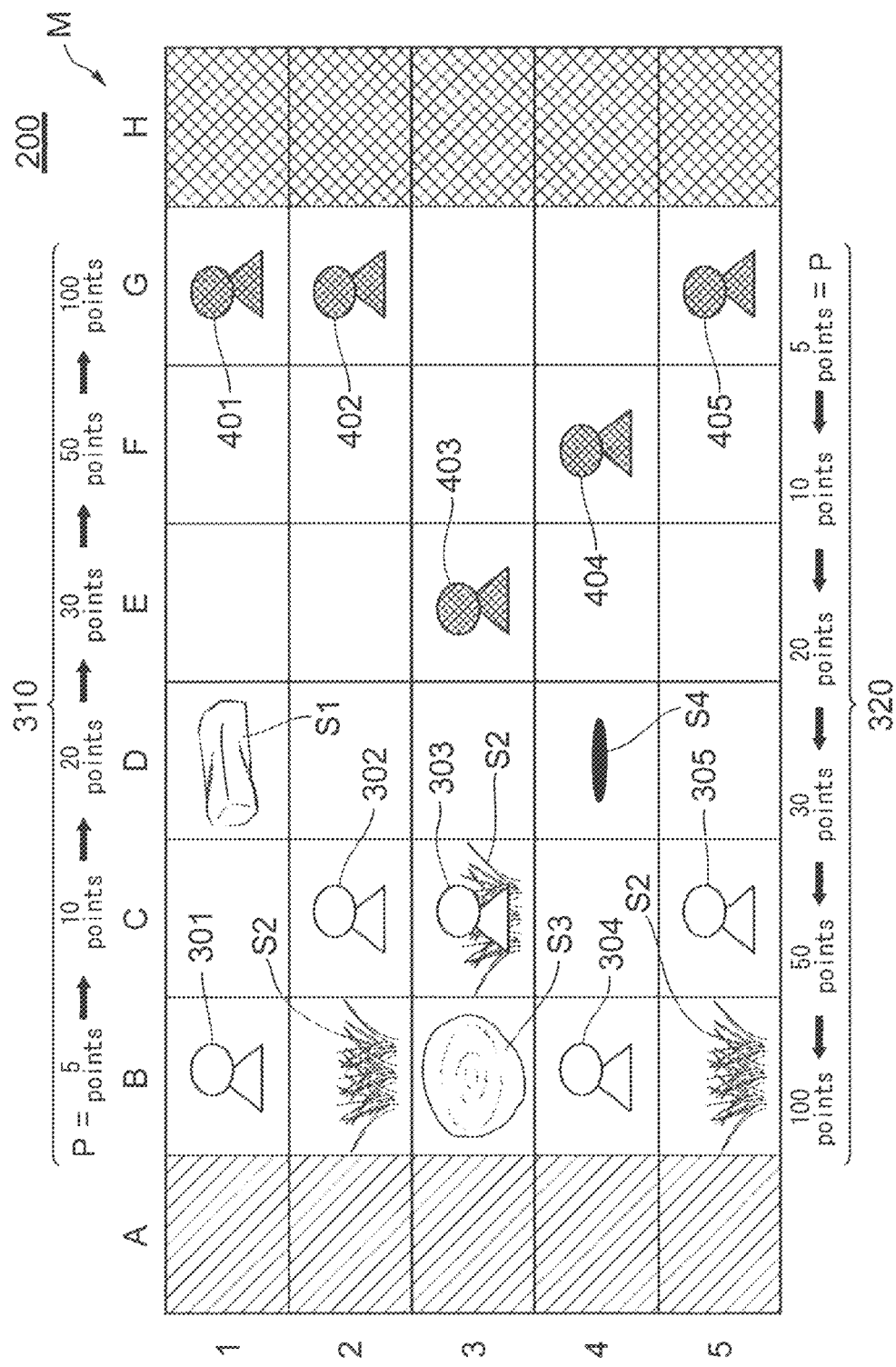
FIG. 8 is a plan view illustrating an example of game items, which cause a predetermined effect on characters in the opponent group, having been placed in areas adjacent to home territory in a battle event according to an embodiment.

FIG. 8 is a plan view illustrating an example of a variety of game items, which cause a predetermined effect on characters in the opponent group, having been placed in areas adjacent to home territory in a battle event according to the present embodiment. FIG. 8 illustrates the state of the areas adjacent to home territory for group 300.

In FIG. 8, item S1 placed in area (1, D) is a "rock", and to pass through this area, the characters in either of the groups 300 and 400 need to attack and destroy the rock. Item S2 placed in areas (2, B), (3, C), and (5, B) is a "tussock", and by lurking in the tussock, the characters in group 300 benefit from increased defense strength against an attack by the opponent group 400. Furthermore, item S3 placed in area (3, B) is a "puddle", and if characters in group 300 get stuck in the puddle, their defense strength is lowered against an attack by the opponent group 400. Additionally, item S4 placed in the area (4, D) is a "pit". If a character in the opponent group 400 falls into the pit, that character for example cannot perform any action, such as movement or attack, for one turn (i.e. the character loses a turn).

Figure 9:
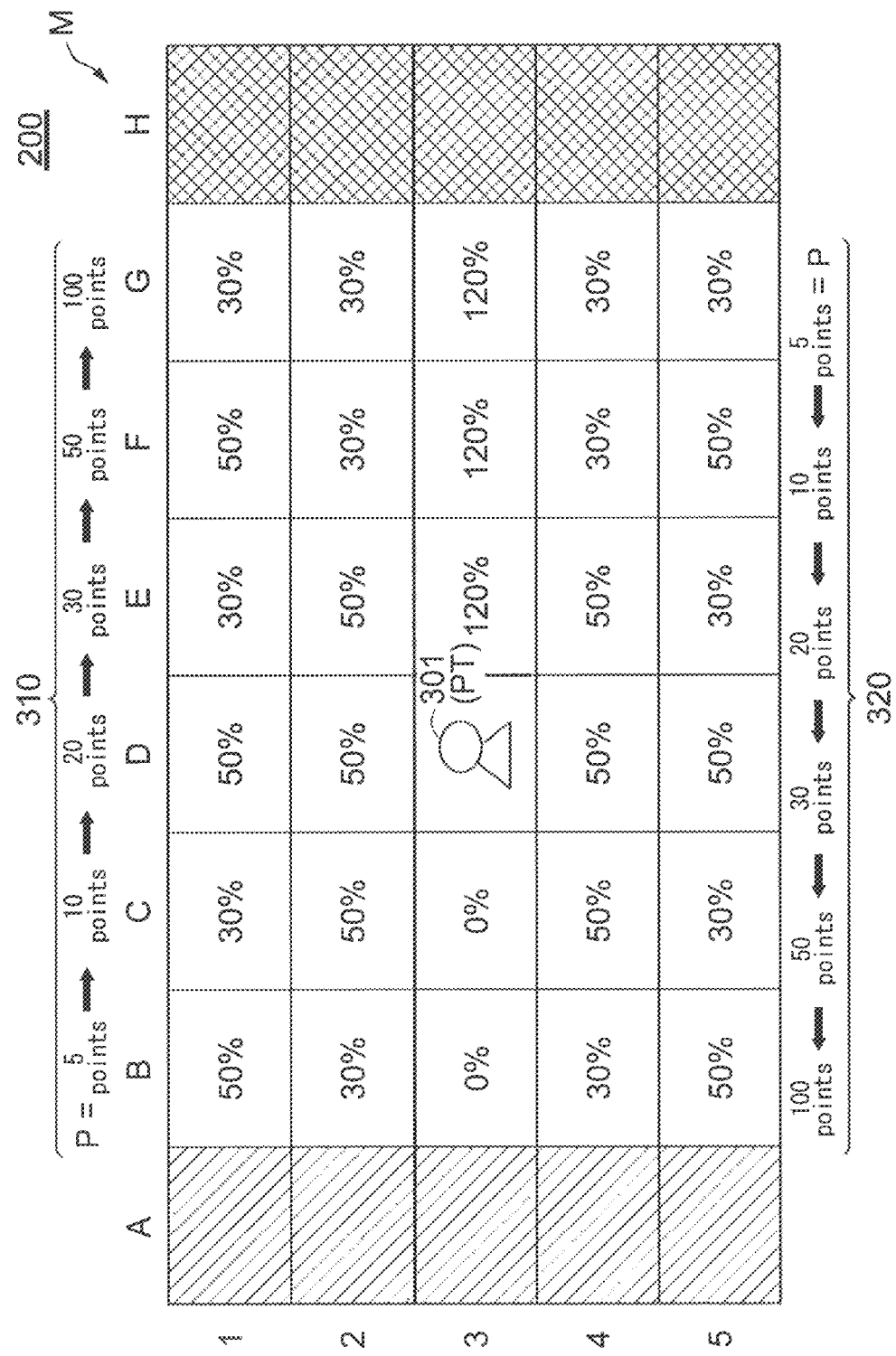
FIG. 9 is a plan view illustrating an example of setting (an adjustment value for) the attack strength of a character in each area on the map in a battle event according to an embodiment.

FIG. 9 is a plan view illustrating an example of setting the attack strength of a character in each area on the map in a battle event according to the present embodiment. As described above, each character has a job or trade set as a property PT. In accordance with the job or trade, the area range over which the character can attack and the attack strength for each area may be adjusted. For example, in FIG. 9, character 301 in group 300 has a property PT of an archer that can attack with a bow and arrow. As the range reached by the bow and arrow, character 301 can attack not only the areas immediately by area (3, D) (first area) in which character 301 is currently positioned, but also nearly all of the areas on the map M.

However, with a regular attack strength of 100% for the bow and arrow, the attack strength for each area varies from 0% to 120% based on the position of each area, as shown in FIG. 9. For example, in the state in FIG. 9, when attacking a character in the opponent group 400 in area (1, G) (second area) by bow and arrow, the attack strength (damage inflicted on the opponent) becomes 30% of the regular value, whereas when attacking a character in the opponent group 400 in area (3, F) (second area) by bow and arrow, the attack strength (damage inflicted on the opponent) becomes 120% of the regular value.

In the game program 40, game system 100, and method for controlling the game system 100 with the above-described configuration according to embodiments of the present disclosure, based on the final arrangement on the map M in a battle event, it is determined which one of the groups 300 and 400 wins the battle event, thereby allowing for high-level game strategy that aims for the final arrangement of a player's group to be superior to the final arrangement of the opponent group. As a result, the game becomes much more strategic, and it becomes much easier to attack in the game, thereby making the battle event and the entire game more lively and amusing and encouraging non-proficient players to participate in the battle event and the game. Since the battle event unfolds and is played with a turn system, the destination of movement by characters in the groups is determined and actual movement is carried out within the time limit for each turn. Therefore, the battle event can proceed rapidly (reliably in real time), for example so that delay does not occur in image display, without depending on the communication environment of the client devices 30 in the game system 100. Problems such as a loss of interest in the game can therefore be prevented.

[2] Castle Siege

Figure 11:
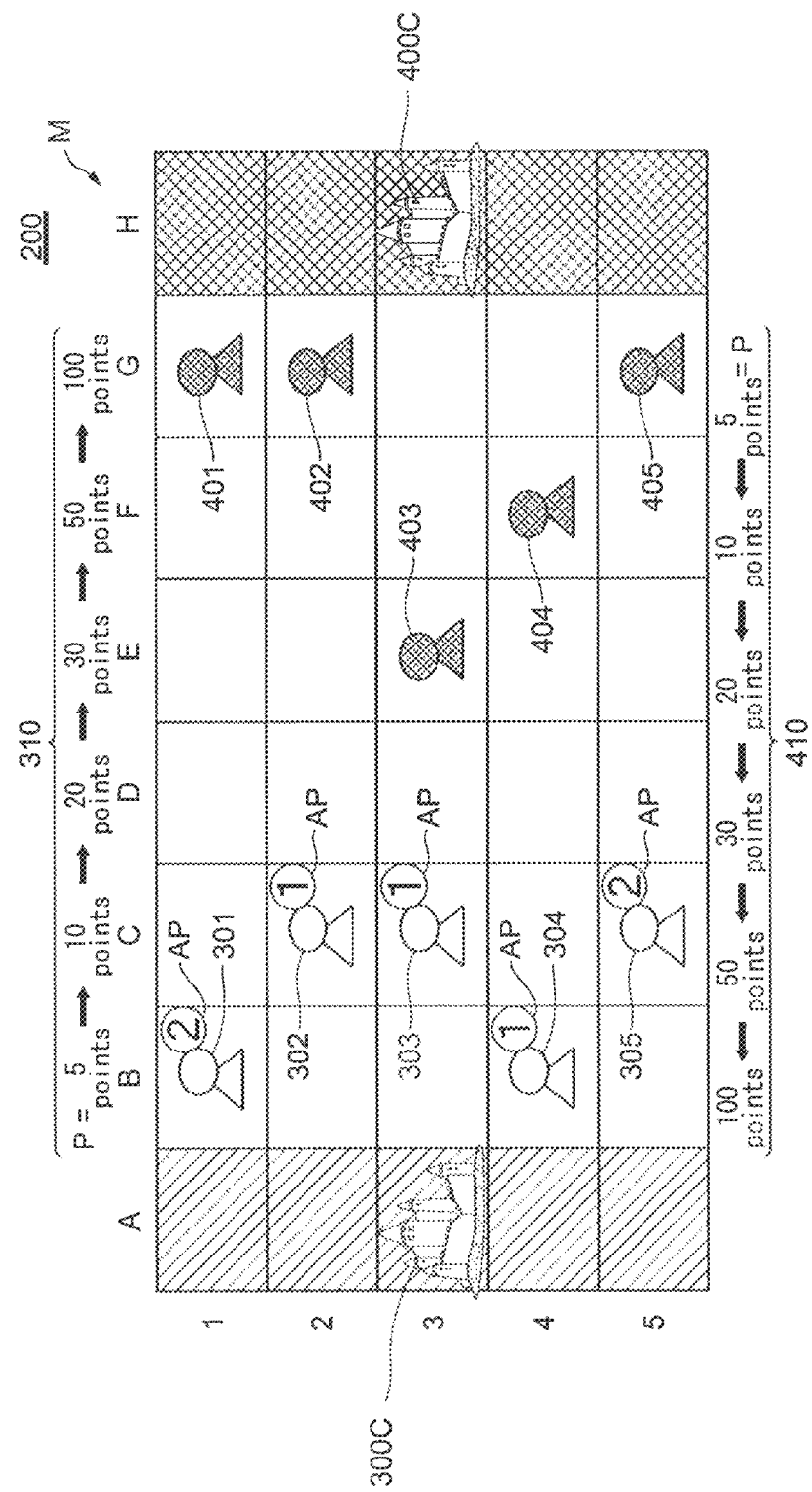
FIG. 11 is a plan view illustrating an example of a game screen for a castle siege in a battle event according to an embodiment.

Next, as another example of gameplay, the following describes a specific example (referred to as a "castle siege") of determining which of the groups wins based on "(1) the total damage inflicted on enemy territory (such as an opponent's castle)" as described at the beginning of [1] Basic Battle. FIG. 11 is a plan view schematically showing an example of a game screen 200 according to the present embodiment. In FIG. 11, castles 300C and 400C that are a first target of defense for groups 300 and 400 are added to the screen example for the basic battle illustrated in FIG. 4. In this example, the castles 300C and 400C are positioned respectively in area (3, A) and area (3, H). In this castle siege, as described above, for example when no characters of the opponent group are in enemy territory or all characters of the opponent group have been eliminated, or when enemy territory is within an attack range of characters, the characters in group 300 can attack the castle 400C, and the characters in group 400 can attack the castle 300C.

As an example of the latter case, when each character has a job or trade set as a property PT, and the area range over which the character can attack is set in accordance with the job or trade, as described above, then if the opponent's castle 300C or 400C is included within the attackable area range, the character can attack the opponent's castle 300C or 400C by using the character's own action points AP.

Figure 12:
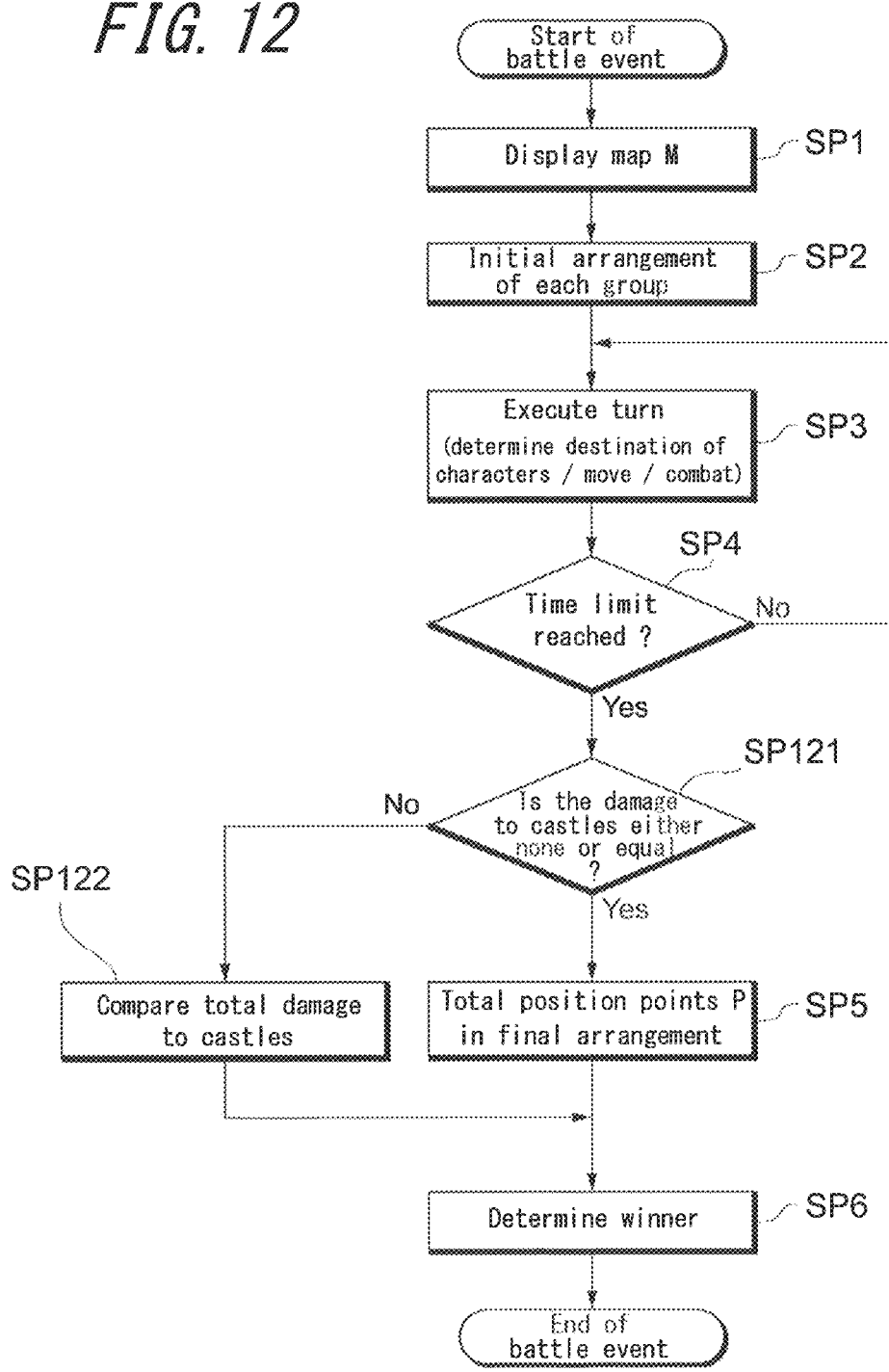
FIG. 12 is a flowchart of basic processing for a castle siege in a battle event according to an embodiment.

In this castle siege, for example as illustrated in FIG. 12, before executing step SP5, conditions corresponding to condition (2) described at the beginning of [1] Basic Battle (whether no group has inflicted damage on the castles 300C and 400C or whether the amounts of total damage inflicted on the castles 300C and 400C are equal) are judged (step S121). When these conditions are satisfied (step SP121: Yes), processing progresses to step SP5, whereas when these conditions are not satisfied (step SP121: No), the total damage inflicted on the castles 300C and 400C is calculated (step SP122), step SP5 is skipped, and which one of the groups 300 and 400 wins is determined (step SP6).

[3] Battle of Generals

Next, as another example of gameplay, the following describes a setting (referred to as a "battle of generals") whereby a "general", who is a leader, is selected from among the characters in each group, and when the hit points HP representing stamina, life force, or the like of the general reach zero, the group to which the general belongs loses, ending the battle event. The general may be chosen by the members of the groups 300 and 400 using an appropriate communication tool or may be selected randomly by the control module 41. In either case, any of the characters 301 to 305 and 401 to 405 may be allowed to be selected as a general, or selection of the general may be restricted to particular characters in accordance with experience or the like.

Figure 13:
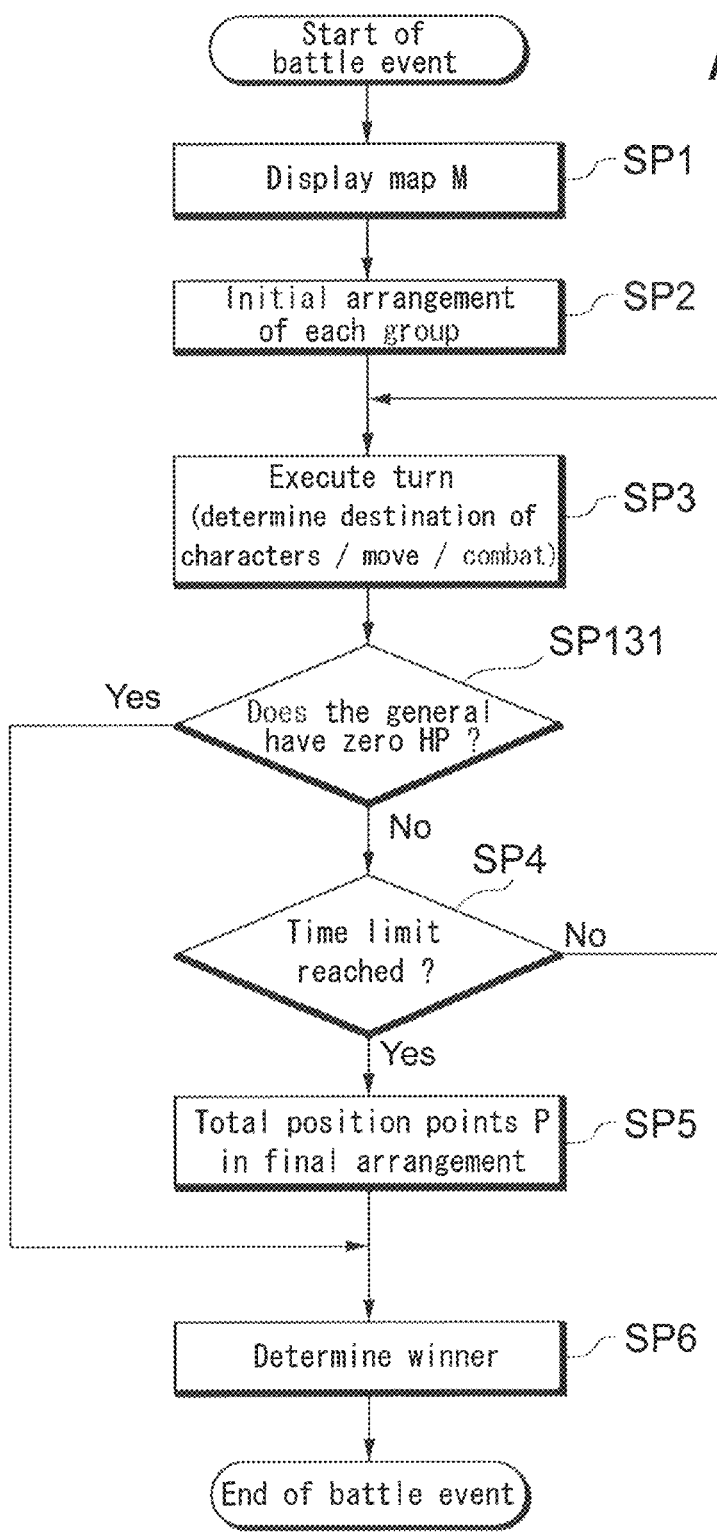
FIG. 13 is a flowchart of basic processing for a battle of generals in a battle event according to an embodiment.

In this battle of generals, as illustrated in FIG. 13, before executing step SP4, it is judged whether the general's hit points HP are zero (step SP131). As a result, when the general's hit points HP are zero (step SP131: Yes), the processing in steps SP4 and SP5 is skipped, step SP6 is executed, and the group that the general with zero hit points HP belongs to loses. Conversely, when the general's hit points HP are not zero (step SP131: No), the processing from the determination in step SP4 onwards is executed. With this battle of generals, even more elaborate tactics are required, as players not only effectively guard their general from enemy attack while invading enemy territory but also take into consideration the arrangement of characters at the end of the battle event. Therefore, the battle event and the game become even more amusing and are endowed with an unusual interest and appeal.

[4] Occupation Battle

Figure 14:
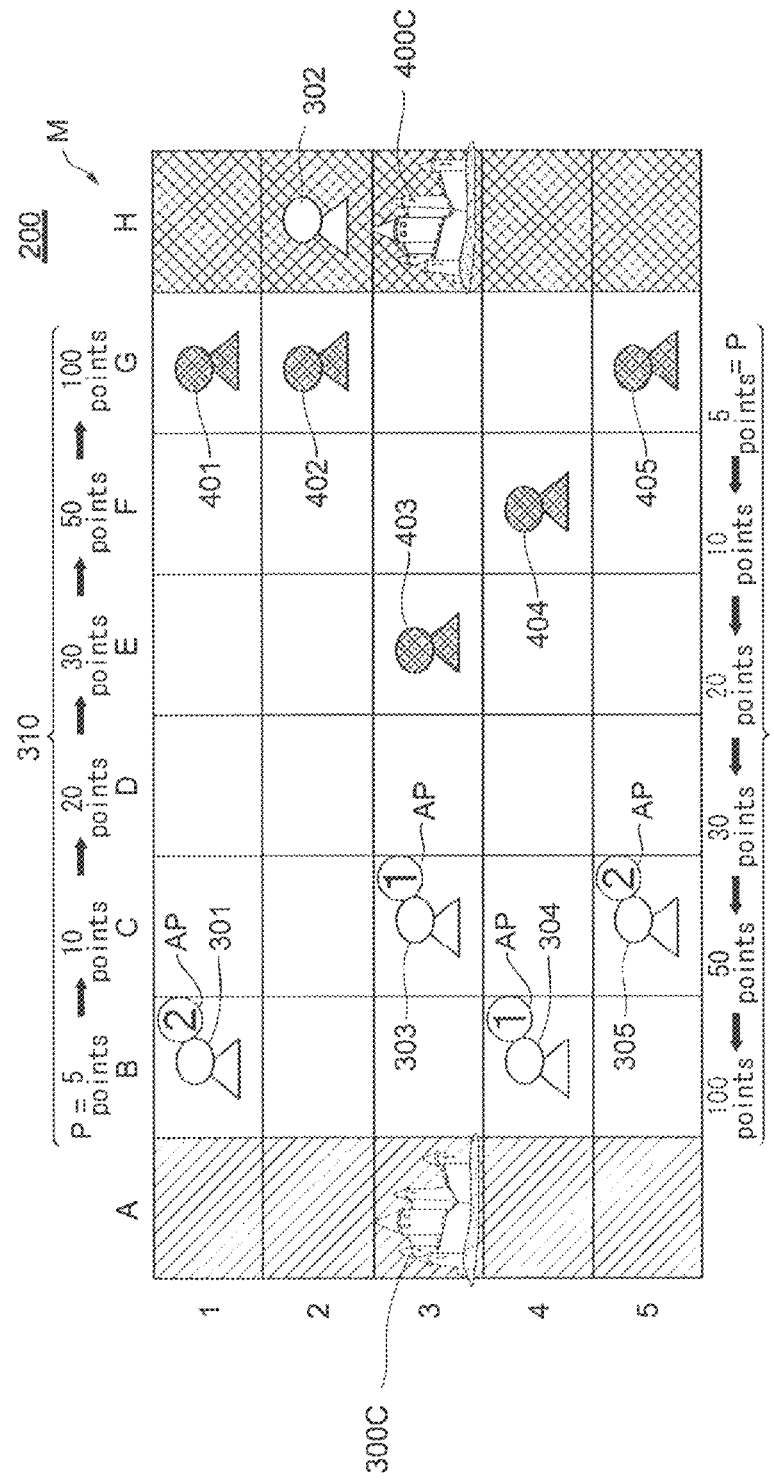
FIG. 14 is a plan view illustrating an example of a game screen for an occupation battle in a battle event according to an embodiment.

As yet another example of gameplay, the following describes how when a character invades the territory of the opponent group (enemy territory), or when a character invades enemy territory and stays there for a certain period of time, i.e. when occupying enemy territory, the group that the character belongs to wins, ending the battle event (referred to as an "occupation battle"). FIG. 14 schematically illustrates an example of a game screen 200 according to the present embodiment, illustrating an example of a state in which a character has invaded enemy territory. In FIG. 14, character 302 in group 300 has gone around behind character 402 in group 400 to invade area (2, H) of the territory of group 400 (enemy territory).

Figure 15:
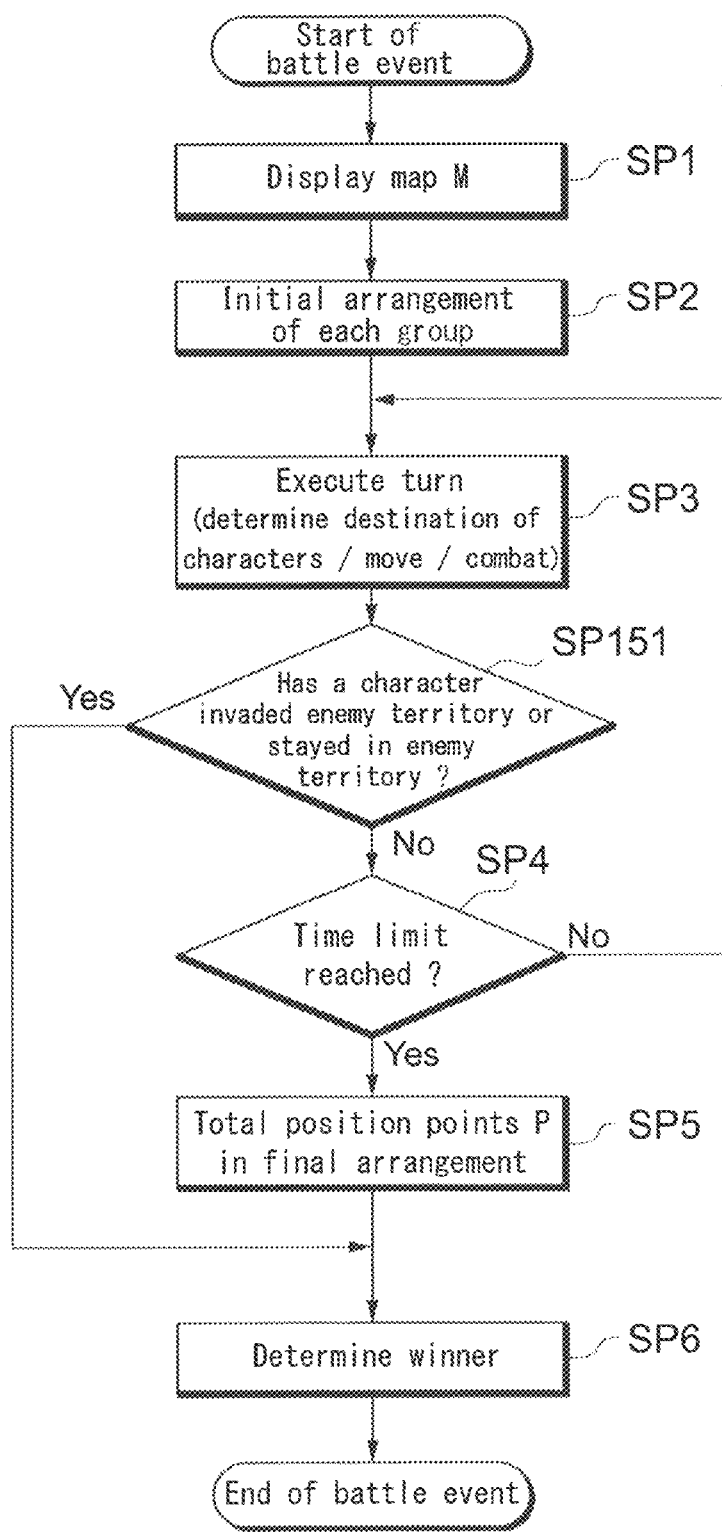
FIG. 15 is a flowchart of basic processing for an occupation battle in a battle event according to an embodiment.

In the occupation battle, as illustrated in FIG. 15, before executing step SP4, it is judged whether a character has invaded the territory of the opponent group (enemy territory), or whether a character has invaded enemy territory and stayed there for a certain period of time (step SP151). As a result, when the determination condition has been satisfied (step SP151: Yes), processing in steps SP4 and SP5 is skipped, step SP6 is executed, and the group that the character belongs to wins. Conversely, when the determination condition is not satisfied (step SP151: No), the processing from the determination in step SP4 onwards is executed. In this context, "when a character invades enemy territory and stays there for a certain period of time" refers, in the example in FIG. 14, to a state in which character 302 in group 300 stays in an area in column H, which includes area (2, H) in enemy territory, for example for two turns or more (such as two consecutive turns among turns Ta to Td in FIGS. 6(A) to 6(C)). With this occupation battle, elaborate tactics are required, as players need to place emphasis on taking risks to invade the opponent's territory while taking into consideration the arrangement of characters at the end of the battle event. Therefore, the battle event and the game become even more amusing and are endowed with an unusual interest and appeal.

[5] Capture Battle

As yet another example of gameplay, the following describes a setting (referred to as a "capture battle") whereby at least one character among the characters in each group conceals a first designated game item (for example a treasure item such as a rare item or rare card). When the hit points HP representing stamina, life force, or the like of the character reach zero, the opponent group captures the treasure item (first designated game item), and the group to which the character belongs loses. The character with the role of concealing the treasure item may be chosen by the members of the groups 300 and 400 using an appropriate communication tool or may be set randomly by the control module 41. While the battle event is underway, the characters in the opponent group are prevented from identifying the character that conceals the treasure item.

Figure 16:
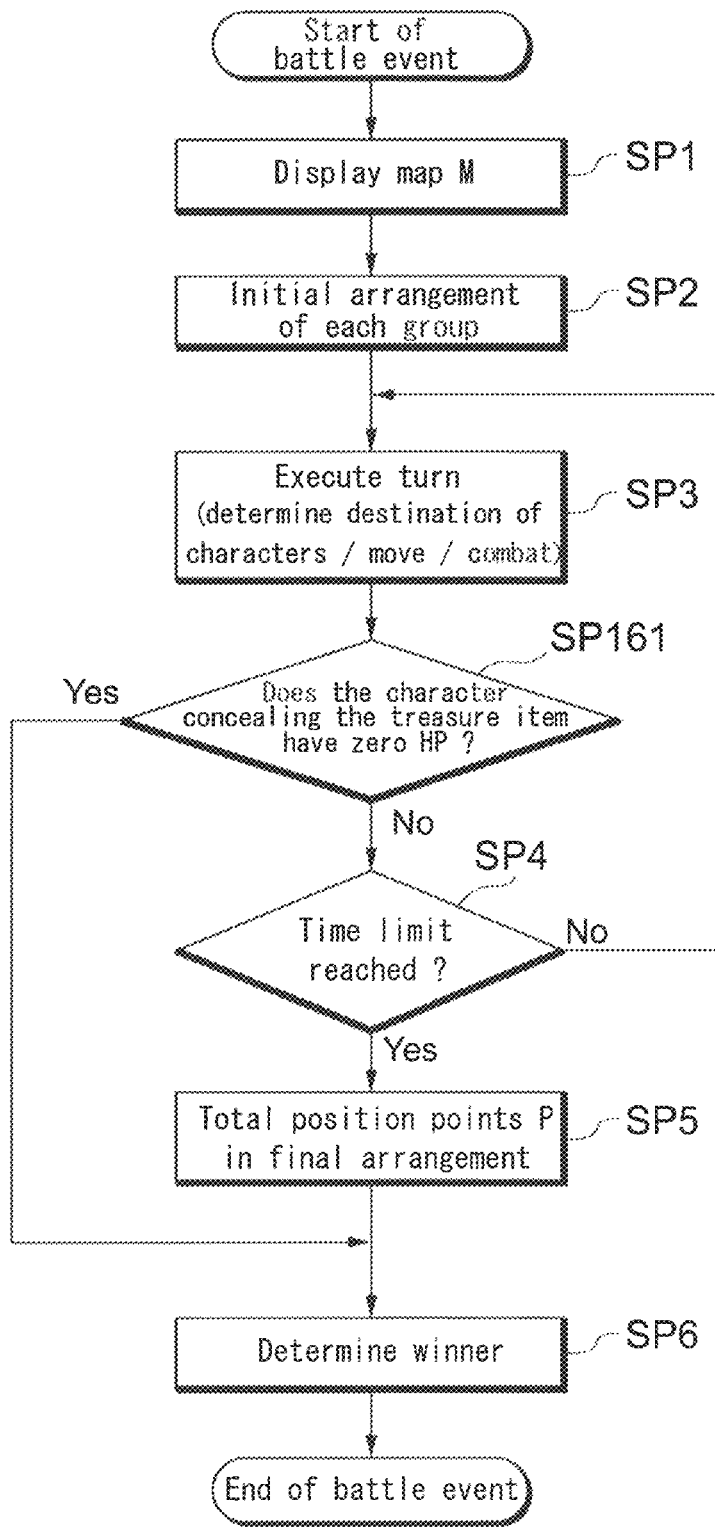
FIG. 16 is a flowchart of basic processing for a capture battle and a treasure battle in a battle event according to an embodiment.

In this capture battle, as illustrated in FIG. 16, before executing step SP4, it is judged whether the hit points HP of the character concealing the treasure item are zero (step SP161). As a result, when the character's hit points HP are zero (step SP161: Yes), the processing in steps SP4 and SP5 is skipped, step SP6 is executed, and the group that the character with zero hit points HP belongs to loses. Conversely, when the hit points HP of the character concealing the treasure item are not zero (step SP161: No), the processing from the determination in step SP4 onwards is executed. With this capture battle, the characters in the opponent group cannot know which character conceals the treasure item, thus adding an element of uncertainty to winning the battle game. Therefore, the battle event and game can be made amusing and interesting in a different sense than use of elaborate tactics.

[6] Treasure Battle

As yet another example of gameplay, the following describes a setting (referred to as a "treasure battle") whereby, in addition to the content of the above-described [5] capture battle, a treasure item that is a second designated game item, or a treasure box containing the treasure item, is hidden in home territory or in areas adjacent to home territory. When an enemy character arrives in the area where the treasure item is hidden, the opponent group that the enemy character belongs to captures the treasure item. As in the above-described [5] capture battle, a setting may be adopted so that when the hit points HP of the character concealing the treasure item that is the first designated game item reach zero, the opponent group captures the treasure item, and the group to which the character belongs loses.

Figure 17:
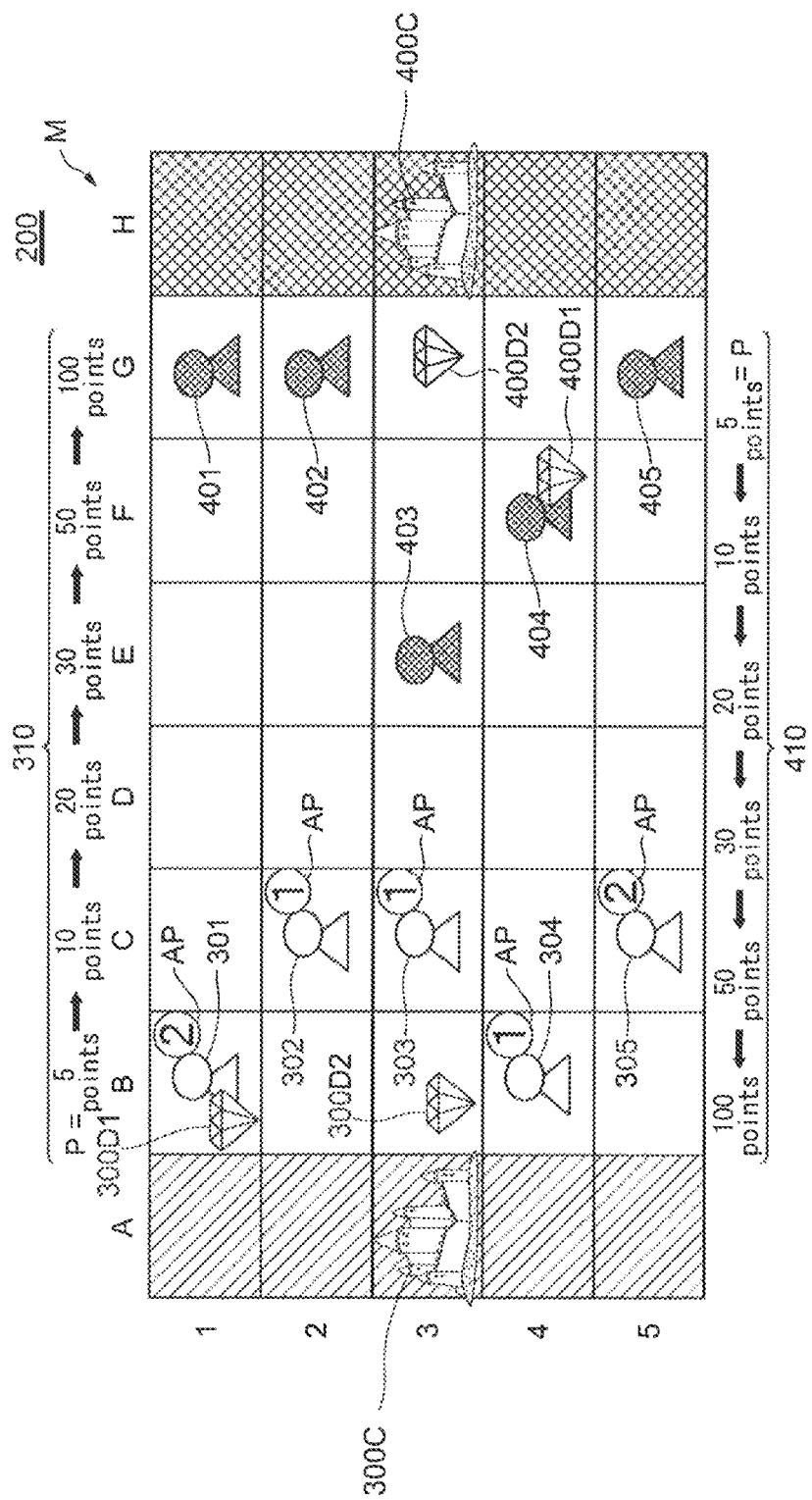
FIG. 17 is a plan view illustrating an example of a game screen for a treasure battle in a battle event according to an embodiment.

FIG. 17 schematically illustrates an example of a game screen 200 according to the present embodiment, illustrating an example of a state in which a treasure item is hidden in a certain area. In FIG. 17, character 301 in group 300 and character 404 in group 400 conceal respective treasure items 300D1 and 400D1 (both being a first designated game item, as in the [5] Capture Battle). Furthermore, treasure item 300D2 for group 300 and treasure item 400D2 for group 400 (both being the second designated game item) are respectively concealed in area (3, B) and area (3, G), which are areas adjacent to home territory. On the game screen 200 of the client device 30 operated by the player, among the treasure items 300D1, 300D2, 400D1, and 400D2, only the treasure items held by the player's group and by characters of allies (friends) are displayed. The treasure items 300D2 and 400D2 may be displayed as being contained in a treasure chest. Furthermore, the basic processing in this treasure battle is, for example, similar to the flowchart of FIG. 16.

[7] Flag Battle

Figure 18:
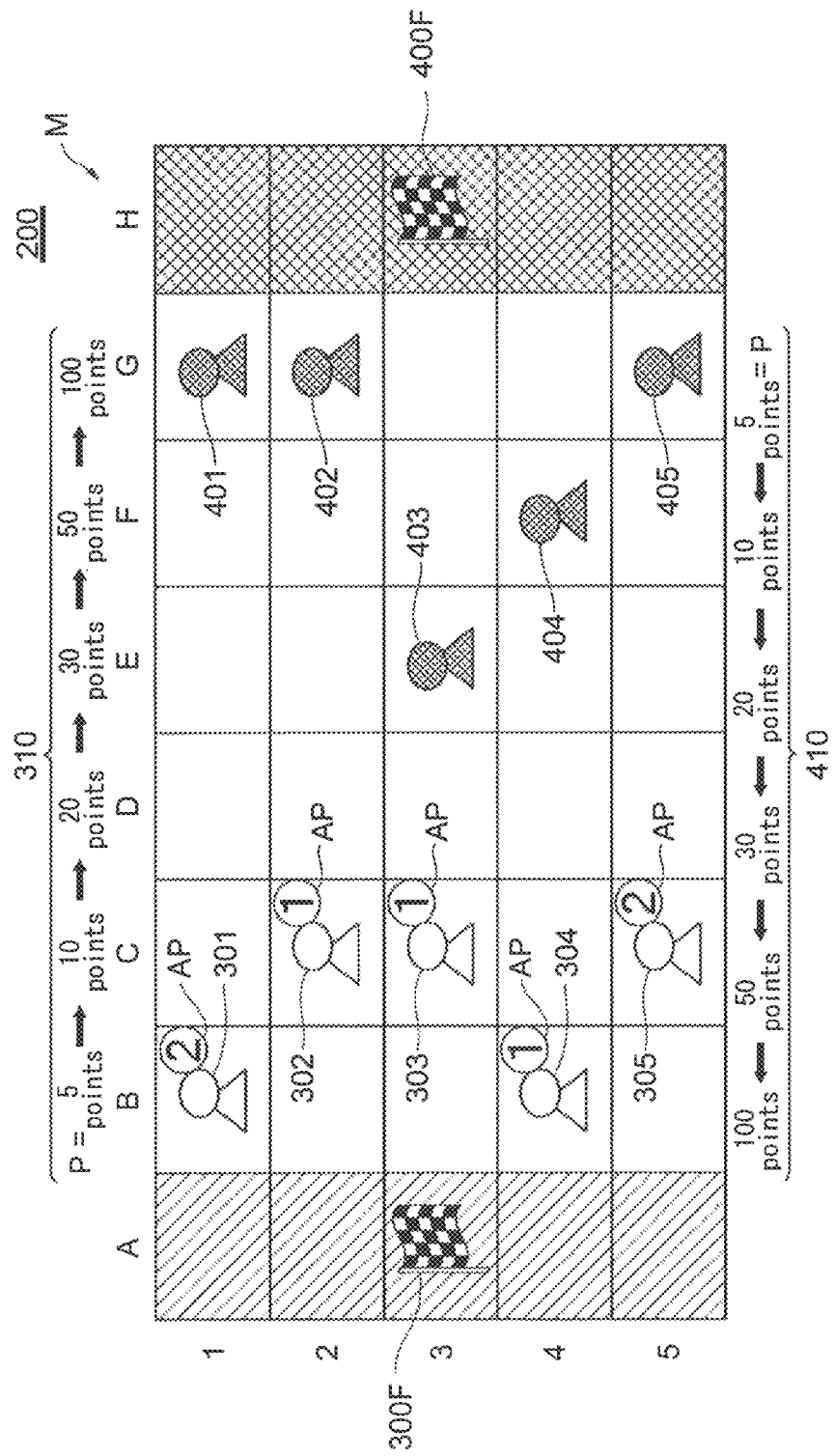
FIG. 18 is a plan view illustrating an example of a game screen for a flag battle in a battle event according to an embodiment.

As yet another example of gameplay, the following describes how a "flag" (banner or battle flag) symbolizing home territory is raised therein, and when a character in the opponent group (enemy character) captures the battle flag (for example, when the battle flag is attacked and destroyed, or when an enemy character is allowed to invade the area in which the battle flag is raised), the group that the battle flag belongs to loses, ending the battle event (referred to as a "flag battle"). FIG. 18 is a plan view schematically showing an example of a game screen 200 according to the present embodiment. In FIG. 18, battle flags 300F and 400F (second target of defense) for groups 300 and 400 are added to the screen example for the basic battle illustrated in FIG. 4. In this example, the battle flags 300F and 400F are positioned respectively in area (3, A) and area (3, H).

Figure 19:
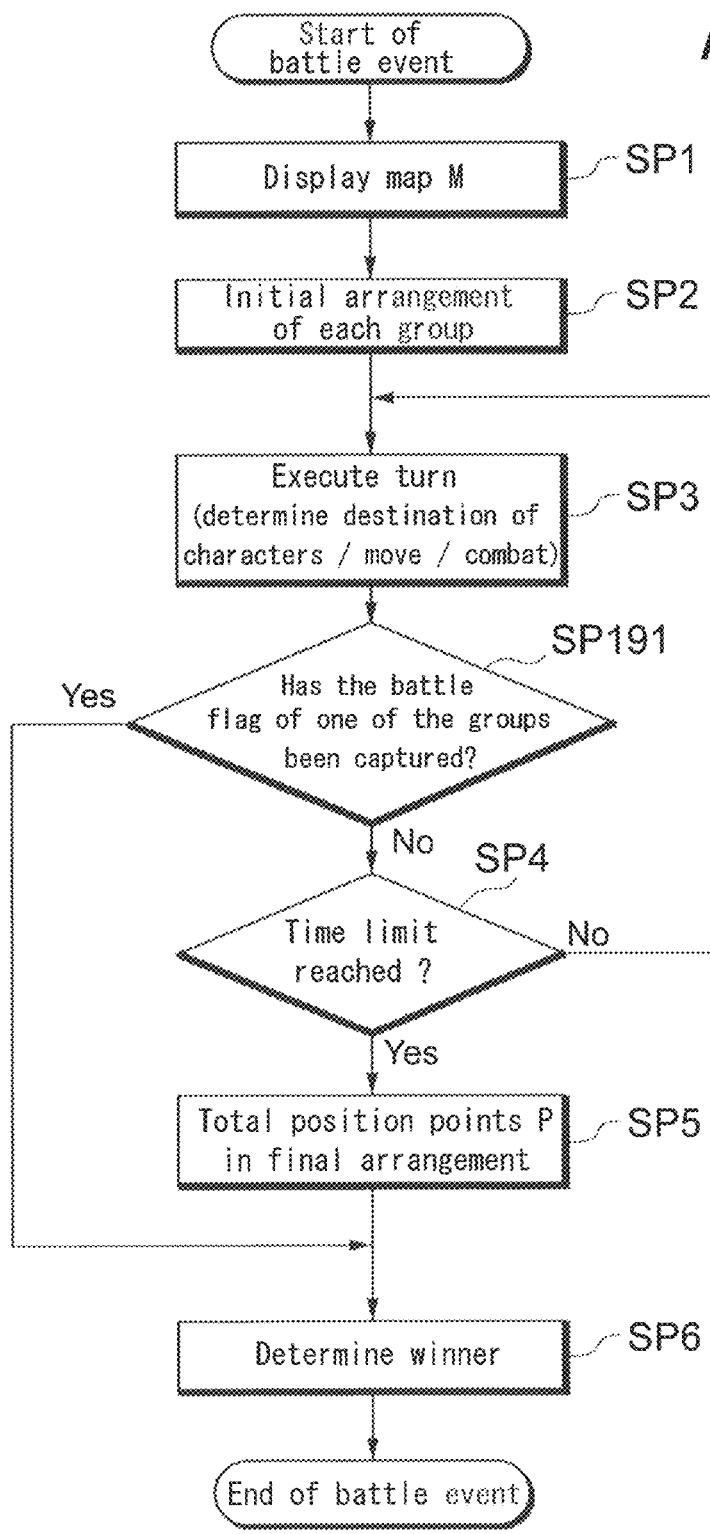
FIG. 19 is a flowchart of basic processing for a flag battle in a battle event according to an embodiment.

In this flag battle, for example as illustrated in FIG. 19, before executing step SP4, it is judged whether the battle flags 300F and 400F have been captured by the opponent group (step SP191). As a result, when the battle flag of either of the groups 300 and 400 has been captured (step SP191: Yes), processing in steps SP4 and SP5 is skipped, step SP6 is executed, and the group whose battle flag was captured loses. Conversely, when the battle flag of neither of the groups 300 and 400 has been captured (step SP191: No), the processing from the determination in step SP4 onwards is executed.

As described above, the above embodiments are only examples for describing the present disclosure, and the present disclosure is not limited to the embodiments. Furthermore, various modifications may be made without departing from the scope of the present disclosure. For example, a person of ordinary skill in the art could replace the resources described in the embodiment (hardware resources and software resources) with non-limiting equivalents, and such replacements are also included in the scope of the present disclosure. The map M is not limited to a simple matrix, nor are the areas limited to being rectangular. A variety of other shapes may be adopted. For example, the map M may be overlaid on the background for scenes corresponding to the worldview of the game and may adopt a shape corresponding to the terrain or the like of the scene. The map M may also have a solid shape extending in three dimensions, and the shape may also change during the battle event. Furthermore, the battle event is not limited to a competition between two groups and may be held among three or more groups.

Figure 20A:
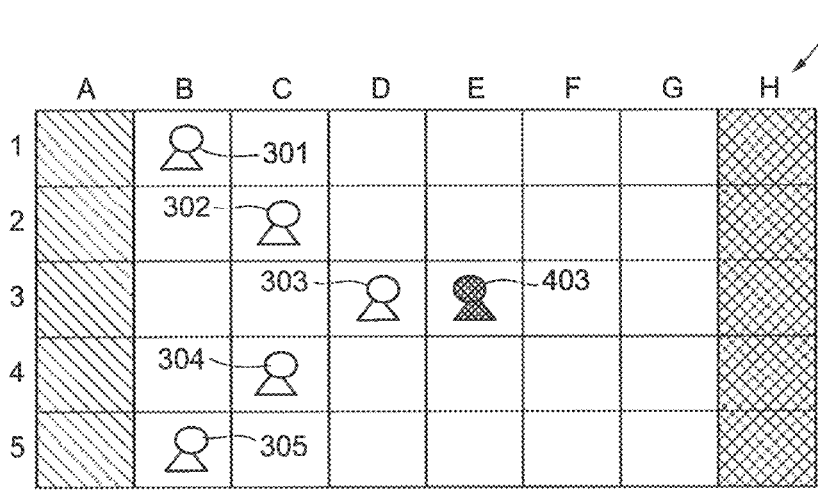
FIGS. 20(A) to 20(C) are plan views illustrating examples of initial formations on the map according to an embodiment.
Figure 20B:
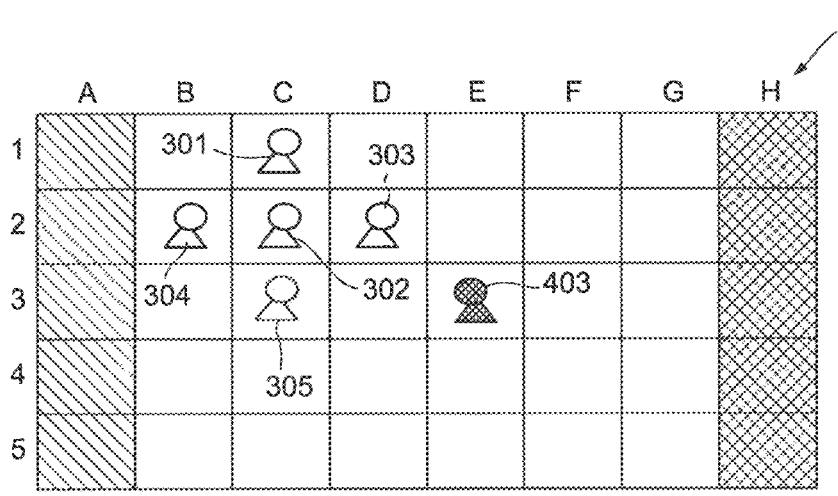
Figure 20C:
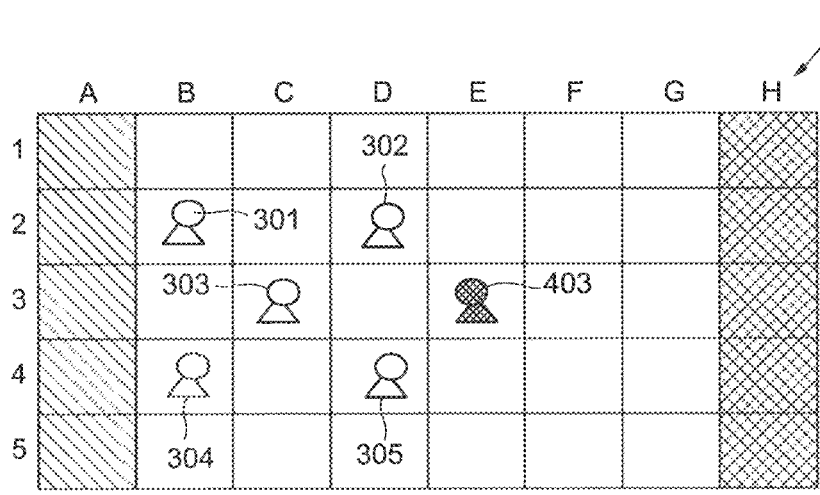

In the example in FIG. 4, the characters in the groups 300 and 400 are arranged in the areas adjacent to home territory (initial arrangement) before the start of the battle event or at the start of the battle event, yet as the initial arrangement, a formation with the patterns illustrated in FIGS. 20(A) to 20(C) (illustrated for the characters in group 300) may be used. These formations are typical arrangements that are particularly effective for attack and/or defense.

For example, the formation illustrated in FIG. 20(A) is a so-called "wing formation" in which a pair of wings form a unified shape. The attack strength and defense strength of character 303 in the lead towards the territory of group 400 enjoy a relatively large increase, whereas the attack strength and defense strength of characters 301 and 305 towards the rear are somewhat reduced. The formation illustrated in FIG. 20(B) can be called a "cross" based on its shape. The defense strength of character 303 in the lead towards the territory of group 400 enjoys a relatively large increase, the attack strength of characters 301 and 305 positioned at the top and bottom edges increases, and the defense strength decreases for character 304 at the rear. Furthermore, the formation in FIG. 20(C) can be referred to as a "phoenix" by analogy to the imaginary sacred bird that is one of the "Four Benevolent Animals". The defense strength of character 303 positioned in the middle of the formation enjoys a relative increase, and the attack strength of all of the other surrounding characters 301, 302, 304, and 305 also increases.

Figure 21A:
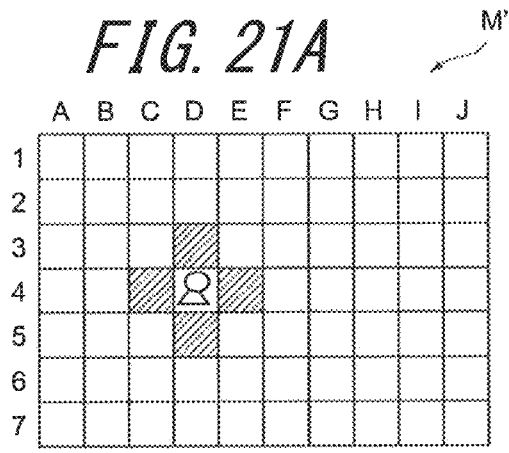
FIGS. 21(A) to 21(F) are plan views illustrating examples of the attack range and movement range of a character on the map according to an embodiment.
Figure 21B:
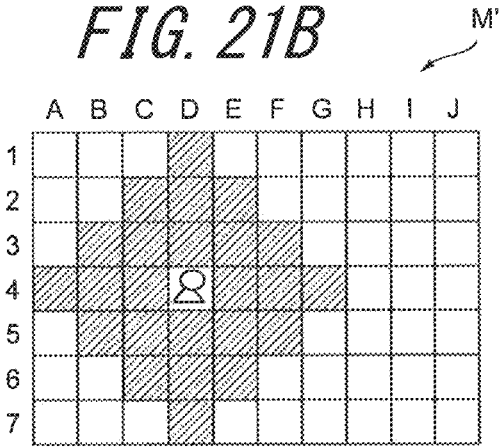
Figure 21C:
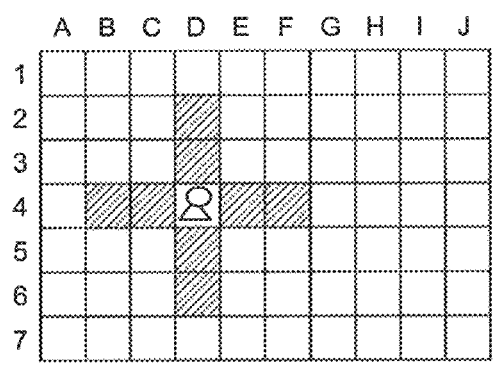
Figure 21D:
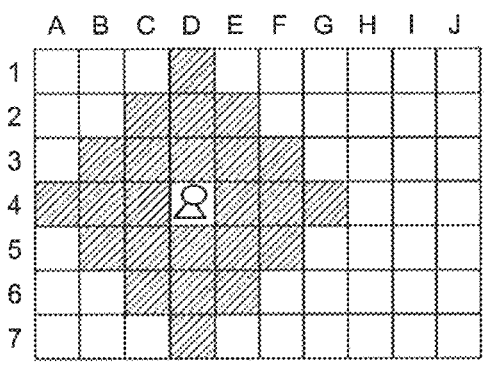
Figure 21E:
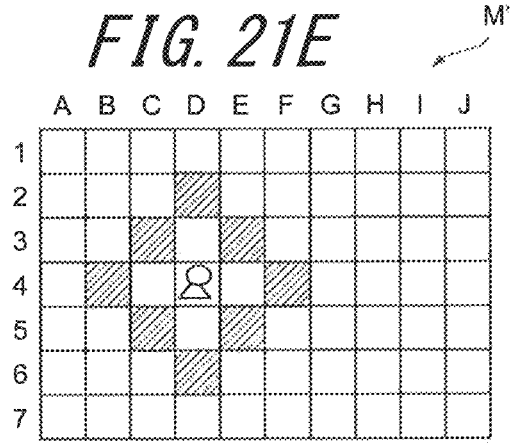
Figure 21F:
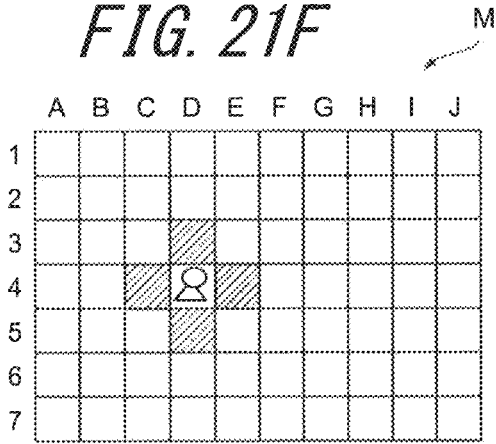

In the above-described embodiment, the allowable range of movement on the map M and the attack range on the map M are set for each character in accordance with the job or trade set as a property PT for the character. FIGS. 21(A) to 21(F) illustrate a more concrete example. The map M' illustrated in these figures has the same structure as the map M, except for being divided into a matrix of seven rows (row 1 to row 7) by ten columns (column A to column J). Among these maps, FIGS. 21(A) and 21(B) illustrate the attack range and the movement range (both indicated as areas with diagonal lines, the same holding below) of a character whose job is "swordsman". FIGS. 21(C) and 21(D) illustrate the attack range and the movement range of a character whose job is "spearman". Furthermore, FIGS. 21(E) and 21(F) illustrate the attack range and the movement range of a character whose job is "mage".

The combination of setting the attack range and movement range to differ by character property PT (job), i.e. by job skill, and using the maps M and M' achieves a synergetic effect. In other words, the job skill equates to the attack range and movement range on the map, and the arrangement of characters resulting from combat that unfolds on the maps M and M' determines which group wins. Hence, the property PT is not merely a "decorative" element, but rather a practical parameter. Since the characters are arranged on the maps M and M', players can confirm at the appropriate time whether an enemy character is located in the attack range that is based on the property PT of a character and can therefore launch attacks with better timing. Explicitly defining the attack range and movement range illustrated in FIGS. 21(A) to 21(F) for the maps M and M' also has the advantage of visually allowing a player to clearly confirm the effect of an action taken by the player's character and the position after movement.

Furthermore, in addition to the above-described job skill, a special "knock back" skill may be set for characters. This knock back is a skill with a function such that a character (attackee) that is attacked by an enemy character (attacker) is pushed back one or more squares in the opposite direction from the attacker and also sustains a predetermined amount of damage. In greater detail, for example when a character having the knock back skill uses the knock back skill to attack an enemy character in a square that is adjacent or within a predetermined range on the map M or M', the enemy character is pushed back one or more squares away from the direction in which the enemy character intends to proceed. In this way, a player can slightly delay the progress of an enemy character advancing on the territory of the player's group (team), yielding a strategic advantage. As mentioned above, an enemy character pushed back by the knock back skill may also sustain damage in addition to being pushed back. A restriction may also be placed so that a character cannot be knocked back when another character is located behind that character. By setting this special skill for characters, the battle event and the game become even more amusing and are endowed with an unusual interest and appeal.

What is claimed is:

1. A computer-readable non-transitory recording medium storing a computer program, the computer program causing a computer for providing a game to a client device over a network to function as a system, the game including a battle event in which groups of characters battle each other, the characters controlled via the client device, wherein the computer program causes the computer to execute:

storing a game parameter, used in the battle event, in association with each of the characters;

providing, to the client device, an image of a map configured to be displayed on the client device, said map including a plurality of areas, at least one area being set as a respective territory for each of the groups of characters, the characters in each of the groups arranged in the plurality of areas adjacent to the group's respective territory;

setting a plurality of point values for the plurality of areas on the map;

causing the characters to move on the map during the battle event;

engaging the characters in combat when the characters satisfy a predetermined condition;

ending the battle event;

after ending the battle event, determining a final arrangement for each of the characters at an ending of the battle event, and totaling the points for each group based on said final arrangement for each of the characters at the ending of the battle event; and comparing the points associated with each of the groups of characters in the final arrangement, and determining which of the groups of characters wins the battle event based on which group of characters is associated with a highest point total;

wherein the ending of the battle event precedes a determination of which of the groups of characters wins the battle event based on the point totals of each group of characters, and wherein the ending of the battle event is based on criteria other than one of the groups of characters reaching a threshold point total.

2. The non-transitory recording medium according to claim 1, further comprising tracking, with a timer, a running time, and further comprising setting a predetermined running time as a time limit; and wherein the ending of the battle event is triggered after a predetermined running time, and a step of determining which of the groups of characters wins the battle event based on the point totals of each group of characters is based on the final arrangement at the predetermined running time.

3. The non-transitory recording medium according to claim 1, wherein a step of engaging the characters in combat further comprises attacking, with a first group of characters, territory of an opponent group or a first target of defense arranged within the territory of the opponent group; and wherein a step of totaling the points for each group based on the final arrangement for each of the characters at an ending of the battle event further comprises determining damage sustained by the territory or the first target of defense of the opponent group at the ending of the battle event.

4. The non-transitory recording medium according to claim 3, wherein a step of engaging the characters in combat further comprises determining if a predetermined condition is met and enabling an attack upon determining that the predetermined condition is met, wherein the predetermined condition comprises at least one of the set of:

(i) no character of the opponent group is in the territory of the opponent group, (ii) all characters of the opponent group have been eliminated, and (iii) the territory or the first target of defense of the opponent group is positioned within an attack range of the characters in each of the groups.

5. The non-transitory recording medium according to claim 1, wherein from among the characters in each group, a general is selected for each group, and the controller determines which of the groups of characters wins the battle event based on a predetermined parameter stored in association with the general.

6. The non-transitory recording medium according to claim 1, wherein a step of totaling the points for each group based on the final arrangement for each of the characters at the ending of the battle event is based on whether any of the characters in a first group has invaded the territory of an opponent group and whether any of the characters in the opponent group has invaded the territory of the first group; and wherein a step of determining which of the groups of characters wins the battle event based on the point totals of each group of characters is based on whether any of the characters in the first group has invaded the territory of the opponent group and whether any of the characters in the opponent group has invaded the territory of the first group.

7. The non-transitory recording medium according to claim 1, further comprising:

designating, from among the characters in each group, a character as being associated with a concealed first designated game item, and during the battle event, preventing characters in an opponent group from identifying that the character is associated with the concealed first designated game item; and wherein a step of determining which of the groups of characters wins the battle event is based on a predetermined parameter stored in association with the character associated with the concealed first designated game item.

8. The non-transitory recording medium according to claim 1, wherein a second designated game item is, in an initial state of the battle event, hidden in the territory or the areas adjacent to the respective territory of each group, and during the battle event, characters in an opponent group are prevented from identifying a location where the second designated game item is hidden.

9. The non-transitory recording medium according to claim 1, wherein for each group, a second target of defense is arranged in the territory or the areas adjacent to the respective territory of each group; and wherein a step of determining which of the groups of characters wins the battle event is further based on whether the second target of defense has been captured by an opponent group.

10. The non-transitory recording medium according to claim 1, wherein position points for each area on the map are set for each group;

wherein a step of totaling the points for each group based on the final arrangement for each of the characters at the ending of the battle event comprises totaling the position points corresponding to a position on the map of each of the characters at the ending of the battle event; and wherein a step of determining which of the groups of characters wins the battle event comprises determining that a group having a higher amount of position points has won the battle event.

11. The non-transitory recording medium according to claim 1, wherein the battle event is divided into a plurality of turns; and wherein the computer program further causes the computer to execute:

receiving, from every group participating in the battle event, within a predetermined time within each turn, instructions comprising one or more positions that are a destination of movement by one or more of the characters; and after the instructions are received, moving the one or more characters in every group to the one or more positions at once or at any time.

12. The non-transitory recording medium according to claim 1, wherein the battle event is divided into a plurality of turns; and wherein the computer program further causes the computer to execute:

receiving, from a first group participating in the battle event, within a predetermined time corresponding to a turn, instructions comprising one or more positions that are a destination of movement by one or more of the characters for the first group;

moving the characters for the first group to the one or more positions at once or at any time;

receiving, from a second group participating in the battle event, within the predetermined time corresponding to a second turn, instructions comprising one or more second positions that are a destination of movement by one or more of the characters for the second group;

moving the characters for the second group to the one or more positions at once or at any time, alternately with the first group.

13. The non-transitory recording medium according to claim 1, wherein the game parameter includes action points consumed during at least one of movement, attack, and defense by the characters for each group, each character being configured to consume action points during at least one of movement, attack, and defense, and wherein the action points are transferrable between the characters in the same group.

14. The non-transitory recording medium according to claim 13, wherein, for each character, when all of the action points of the character are consumed, the controller forcibly moves the character to a predetermined position in the character's respective territory.

15. The non-transitory recording medium according to claim 1, wherein:

the game parameter includes a property that is set for each character;

an attack strength of each character is set for each area on the map; and the attack strength of each character for each area is determined based on the property of the character and on a relative positional relationship between a first area and a second area among the areas, the first area being a location occupied by the character, and the second area being a location other than the first area.

16. The non-transitory recording medium according to claim 1, further comprising:

receiving an instruction from a player to set a game item in the areas adjacent to the player's respective territory; and providing a predetermined effect with the game item on at least one of: the characters in an opponent group, and the characters in the group of the player.

17. A game system for providing a game to a client device over a network, the game including a battle event in which groups of characters battle each other, the characters controlled via the client device, the game system comprising:

a server device; and a client device, the server device comprising:

a memory resource configured to store a game parameter, used in the battle event, in association with each of the characters;

an image processor configured to display, on the client device, an image of a map including a plurality of areas, at least one area being set as a respective territory for each of the groups of characters, the characters in each of the groups arranged in the plurality of areas adjacent to the group's respective territory; and a controller configured to:

set a plurality of point values for the plurality of areas on the map;

cause the characters to move on the map during the battle event;

engage the characters in combat when the characters satisfy a predetermined condition;

end the battle event;

after ending the battle event, determine a final arrangement for each of the characters at an ending of the battle event, and total the points of each group based on said final arrangement for each of the characters at the ending of the battle event; and compare the points associated with each of the groups of characters in the final arrangement, and determine which of the groups of characters wins the battle event based on which group of characters is associated with a highest point total, wherein the ending of the battle event precedes a determination of which of the groups of characters wins the battle event based on the point totals of each group of characters, and wherein the ending of the battle event is based on criteria other than one of the groups of characters reaching a threshold point total.

18. A method for controlling a game system that provides a game to a client device over a network, the game including a battle event in which groups of characters battle each other, the characters controlled via the client device, comprising the steps of:

storing a game parameter, used in the battle event, in association with each of the characters;

providing, to the client device, an image of a map configured to be displayed on the client device, said map including a plurality of areas, at least one area being set as a respective territory for each of the groups of characters, the characters in each of the groups arranged in the plurality of areas adjacent to the group's respective territory;

setting a plurality of point values for the plurality of areas on the map;

causing the characters to move on the map during the battle event;

engaging the characters in combat when the characters satisfy a predetermined condition;

ending the battle event;

after ending the battle event, determining a final arrangement for each of the characters at an ending of the battle event, and totaling the points for each group based on said final arrangement for each of the characters at the ending of the battle event; and comparing the points associated with each of the groups of characters in the final arrangement, and determining which of the groups of characters wins the battle event based on which group of characters is associated with a highest point total;

wherein the ending of the battle event precedes a determination of which of the groups of characters wins the battle event based on the point totals of each group of characters, and wherein the ending of the battle event is based on criteria other than one of the groups of characters reaching a threshold point total.

* * * * *